US008563670B2

(12) United States Patent
Brothers et al.

(10) Patent No.: US 8,563,670 B2
(45) Date of Patent: Oct. 22, 2013

(54) NUCLEATION IN AQUEOUS POLYMERIZATION OF FLUOROMONOMER

(75) Inventors: Paul Douglas Brothers, Chadds Ford, PA (US); Subhash Vishnu Gangal, Hockessin, DE (US); Dipti Dilip Khasnis, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 85 days.

(21) Appl. No.: 13/292,344

(22) Filed: Nov. 9, 2011

(65) Prior Publication Data

US 2012/0116017 A1    May 10, 2012

Related U.S. Application Data

(60) Provisional application No. 61/411,616, filed on Nov. 9, 2010, provisional application No. 61/498,791, filed on Jun. 20, 2011.

(51) Int. Cl.
*C08F 2/16* (2006.01)
*C08F 114/18* (2006.01)

(52) U.S. Cl.
USPC ............................................. 526/75; 526/242

(58) Field of Classification Search
USPC ................. 526/61, 75, 242; 524/805
See application file for complete search history.

(56) References Cited

U.S. PATENT DOCUMENTS

| | | | |
|---|---|---|---|
| 2,559,752 A | 7/1951 | Berry | |
| 3,009,892 A | 11/1961 | Duddington et al. | |
| 3,037,953 A | 6/1962 | Marks et al. | |
| 3,271,341 A | 9/1966 | Garrison | |
| 3,282,875 A | 11/1966 | Connolly et al. | |
| 3,391,099 A | 7/1968 | Punderson | |
| 3,859,262 A | 1/1975 | Hartwimmer | |
| 4,036,802 A | 7/1977 | Poirier | |
| 4,098,978 A | 7/1978 | Mikofalvy et al. | |
| 4,342,675 A | 8/1982 | Gangal | |
| 4,358,545 A | 11/1982 | Ezzell et al. | |
| 4,463,144 A | 7/1984 | Kojima et al. | |
| 4,552,631 A | 11/1985 | Bissot et al. | |
| 4,940,525 A | 7/1990 | Ezzell et al. | |
| 5,530,078 A | 6/1996 | Felix et al. | |
| 5,637,748 A | 6/1997 | Hong et al. | |
| 5,925,705 A | 7/1999 | Araki et al. | |
| 5,959,026 A | 9/1999 | Abusleme et al. | |
| 6,177,196 B1 | 1/2001 | Brothers et al. | |
| 6,300,445 B1 | 10/2001 | Hong et al. | |
| 6,512,063 B2 | 1/2003 | Tang | |
| 6,841,616 B2 | 1/2005 | Wille et al. | |
| 6,869,997 B2 | 3/2005 | Wille et al. | |
| 7,064,170 B2 | 6/2006 | Kaspar et al. | |
| 7,074,862 B2 | 7/2006 | Kaspar et al. | |
| 7,122,610 B2 | 10/2006 | Wille et al. | |
| 7,521,513 B2 | 4/2009 | Tang | |
| 7,566,762 B2 | 7/2009 | Otsuka et al. | |
| 7,705,074 B2 | 4/2010 | Brothers et al. | |
| 7,763,680 B2 | 7/2010 | Aten et al. | |
| 7,897,682 B2 | 3/2011 | Brothers et al. | |
| 7,977,438 B2 | 7/2011 | Brothers et al. | |
| 8,080,621 B2 | 12/2011 | Amin-Sanayei et al. | |
| 2005/0090613 A1 | 4/2005 | Maruya et al. | |
| 2006/0128872 A1* | 6/2006 | Zipplies et al. | 524/545 |
| 2006/0281845 A1 | 12/2006 | Amin-Sanayei et al. | |
| 2006/0281946 A1 | 12/2006 | Morita et al. | |
| 2007/0015864 A1 | 1/2007 | Hintzer et al. | |
| 2007/0015865 A1 | 1/2007 | Hintzer et al. | |
| 2007/0015866 A1 | 1/2007 | Hintzer et al. | |
| 2007/0032591 A1 | 2/2007 | Durali et al. | |
| 2007/0082993 A1 | 4/2007 | Amin-Sanayei et al. | |
| 2007/0135546 A1 | 6/2007 | Amin-Sanayei et al. | |
| 2007/0149733 A1 | 6/2007 | Otsuka et al. | |
| 2007/0270534 A1 | 11/2007 | Amin-Sanayei et al. | |
| 2007/0282044 A1 | 12/2007 | Cavanaugh et al. | |
| 2008/0114121 A1 | 5/2008 | Brothers et al. | |
| 2008/0114143 A1 | 5/2008 | Brothers et al. | |
| 2008/0125558 A1* | 5/2008 | Tang | 526/213 |
| 2008/0146757 A1 | 6/2008 | Lyons | |
| 2008/0262177 A1 | 10/2008 | Lyons | |
| 2009/0221776 A1 | 9/2009 | Durali et al. | |
| 2010/0160490 A1 | 6/2010 | Leffew et al. | |

FOREIGN PATENT DOCUMENTS

| | | |
|---|---|---|
| CA | 878571 A | 8/1971 |
| GB | 1299520 | 12/1972 |
| JP | 2004-359870 | 12/2004 |
| WO | 2007046345 A1 | 4/2007 |
| WO | 2007046377 A1 | 4/2007 |
| WO | 2007046482 A1 | 4/2007 |
| WO | 2007049517 A1 | 5/2007 |
| WO | 2008019155 A1 | 2/2008 |
| WO | 2009013214 A1 | 1/2009 |
| WO | 2009126504 A2 | 10/2009 |
| WO | 2011024856 A1 | 3/2011 |
| WO | 2011024857 A1 | 3/2011 |

OTHER PUBLICATIONS

Kasai et al, J Appl Polymer Sci, 57, 797 (1995).
Silberberg, M. S., Chemistry, The Molecular Nature of Matter and Change, 5 Ed., Published by McGraw-Hill Higher Education (2009), Periodic Table on Back of Front Cover.
Ebnesajjad, S. Fluoroplastics, vol. 2 Melt Processible Fluoropolymers, Plastic Design Library (2003), p. 27.
Emulsion Polymerization of Acrylic Monomers, May 1966, Published by Rohm and Haas Company, Philadelphia, PA.

* cited by examiner

*Primary Examiner* — Kelechi Egwim

(57) ABSTRACT

A process is provided for polymerizing fluoromonomer in an aqueous medium, wherein a dispersion of essentially surfactant-free hydrocarbon-containing oleophilic nucleation sites is first formed in the aqueous medium, and then polymerization is commenced to form a dispersion of fluoropolymer particles at the oleophilic nucleation sites, wherein the nucleation sites can be derived from hydrocarbon-containing compound. The surfactant used to stabilize the fluoropolymer dispersion can also be hydrocarbon-containing.

6 Claims, No Drawings

NUCLEATION IN AQUEOUS POLYMERIZATION OF FLUOROMONOMER

FIELD OF THE INVENTION

This invention relates to the aqueous polymerization of fluoromonomer and more particularly to the formation of nucleation sites for attracting polymerized fluoromonomer to form fluoropolymer particles in the aqueous polymerization medium.

BACKGROUND OF THE INVENTION

U.S. Pat. No. 3,391,099 (Punderson) discloses the dispersion polymerization of tetrafluoroethylene in an aqueous medium to consist of two distinct phases after kickoff of the polymerization process, first, the formation of polymer nuclei as nucleation sites and then a growth phase involving polymerization on the established particles. "Kickoff" is the commencement (kicking off) of the polymerization reaction as indicated by pressure decrease within the fluoromonomer pressured-up reactor, resulting from gaseous fluoromonomer within the reactor becoming fluoropolymer and precipitating from the gaseous state to become dispersed fluoropolymer particles.

SUMMARY OF THE INVENTION

The present invention is directed to the formation of nucleation sites prior to the kickoff of the polymerization reaction.

The invention can be described as a process for polymerizing fluoromonomer to form a dispersion of fluoropolymer particles in an aqueous medium in a polymerization reactor, the process comprising an initial period which comprises adding to the polymerization reactor:

(a) aqueous medium,
(b) water-soluble hydrocarbon-containing compound,
(c) degradation agent,
(d) fluoromonomer, and
(e) polymerization initiator, wherein during the initial period no fluorosurfactant is added, and wherein the degradation agent is added prior to the polymerization initiator.

Some of the preferences for the polymerization process of the present invention include the following, individually and in combination:

Preferably, the fluoromonomer (d) is added prior to the polymerization initiator (e).

Preferably, the water-soluble hydrocarbon-containing compound is added in an amount of no greater than 50 ppm, preferably in an amount of no greater than 40 ppm.

Preferably, the water-soluble hydrocarbon-containing compound contains at least one hydrophilic moiety and at least one hydrophobic moiety.

Preferably, the water-soluble hydrocarbon-containing compound is selected from cationic surfactants, nonionic surfactants, and anionic surfactants.

Preferably, the water soluble hydrocarbon containing compound is ethoxy-containing surfactant.

Preferably, the degradation agent is a compound which is the same as or different from the polymerization initiator, preferably the same as the polymerization initiator.

Preferably, the degradation agent is added in an amount sufficient to obtain an aqueous medium essentially free of the water-soluble hydrocarbon-containing compound.

Preferably, the addition of degradation agent results in the formation of oleophilic nucleation sites by degradation of the water-soluble hydrocarbon-containing compound. Addition of the degradation agent prior to the polymerization initiator preferably results in the oleophilic nucleation sites forming, or at least commencing forming prior to kicking off of the polymerization of the fluoromonomer caused by the polymerization initiator. The kicking off of the polymerization forms an initial dispersion of fluoropolymer particles during the initial period of the process.

Preferably, a water-soluble inorganic salt is added to the polymerization reactor prior to the degradation agent.

Preferably, the water-soluble inorganic salt is added to the polymerization reactor in an amount of no greater than 125 ppm.

Preferably, the fluoromonomer is a perfluoromonomer.

Preferably, the process comprises a stabilization period subsequent to the initial period.

Preferably, hydrocarbon-containing surfactant is added during the stabilization period. The polymerization of fluoromonomer up to the time of the stabilization period provides the initial dispersion of fluoropolymer particles. Continued polymerization in the stabilization period cause these particles to grow. Preferably, this surfactant stabilizes the initial dispersion of fluoropolymer particles after formation in the initial period, through the particle growth phase of the polymerization, leading to the final stabilized dispersion of fluoropolymer particles at the completion of the polymerization.

Preferably, the hydrocarbon-containing surfactant added during the stabilization period is different from the hydrocarbon-containing compound added during the initial period.

Preferably, the hydrocarbon-containing surfactant is hydrocarbon surfactant. Preferably, the hydrocarbon-containing surfactant added during the stabilization period is anionic.

Preferably, no fluorosurfactant is added during the stabilization period.

Preferably, no halogen-containing surfactant is added during the process. Preferably no fluorosurfactant is added during the process.

The present invention further provides a fluoropolymer dispersion obtainable by the process and any of the disclosed preferences. Further, the present invention provides a fluoropolymer resin obtainable by isolation from the fluoropolymer dispersion obtainable by the process and any of the disclosed preferences.

The present invention can also be described as a process for polymerizing fluoromonomer in an aqueous medium in a polymerization reactor, comprising forming a dispersion of hydrocarbon-containing oleophilic nucleation sites in the medium, the dispersion being essentially free of surfactant, and thereafter kicking off the polymerizing of the fluoromonomer to form a dispersion of fluoropolymer particles at the oleophilic nucleation sites. Thus, the dispersion of nucleation sites is essentially free of all surfactant, including halogen-containing surfactant, such as fluorine-containing and chlorine-containing surfactant and hydrocarbon-containing surfactant.

The oleophilic nucleation sites dispersed in the aqueous medium are not polymer seeds and as formed are preferably free of polymerized fluoromonomer.

The presence of the dispersion of oleophilic nucleation sites without the assistance of surfactant to maintain these sites dispersed is unexpected. This contradictory condition can be achieved, however, by how the sites are formed. The dispersion of oleophilic nucleation sites is preferably formed by degrading a water-soluble hydrocarbon-containing compound that contains hydrophilic moiety imparting water solubility to the compound and hydrophobic moiety. Thus, these sites are preferably the product of the degradation reaction. Prior to degradation, the hydrophilic moiety of the compound cloaks the hydrophobic moiety with hydrophilicity, thereby allowing the compound to be water soluble. Degradation of the compound degrades the hydrophilicity of the compound, i.e. the hydrophilic moiety of the compound, thereby being effective to enable the hydrophobic moiety of the hydrocarbon-containing compound to become the well dispersed oleophilic nucleation sites. These sites are hydrocarbon-containing, arising from the hydrocarbon content of the hydrophobic moiety precursor. These sites are accessible to and have an affinity for the precipitating fluoropolymer formed at the kicking off of the polymerization process. The preferred method of causing the degradation of the water-soluble hydrocarbon-containing compound is to react the hydrocarbon-containing compound with a degradation agent. The degradation agent is preferably an oxidizing agent, wherein the degradation reaction is preferably an oxidation reaction. In that regard, the oleophilic nucleation sites can be the product of a degradation reaction, preferably an oxidation reaction.

For simplicity and brevity, the disclosures herein of degradation reaction, degradation agent, and degrade and the like, include the preferred oxidation reaction, oxidation agent, and oxidize, respectively, without the need to repeat these preferences.

That the nucleation sites remain dispersed upon the degradation of the hydrophilicity of the compound is a result of the oleophilic nucleation sites being preferably derived from a compound that is soluble in the aqueous medium. The distribution of the dissolved hydrocarbon-containing compound is on a molecular basis within the aqueous medium. The oleophilic nucleation sites obtained from the compound enjoy this same distribution, thereby not requiring surfactant to maintain the dispersion of oleophilic nucleation sites.

The water-soluble hydrocarbon-containing compound from which the oleophilic nucleation sites are derived is preferably a surfactant. Surfactant is a compound that has hydrophobic and hydrophilic moieties, enabling the surfactant to be water soluble, which enables it to disperse and stabilize hydrophobic entities such as fluoropolymer particles, in an aqueous medium. The water soluble hydrocarbon-containing compound or hydrocarbon-containing surfactant (collectively referred to as hydrocarbon-containing compound/surfactant) is the degradation precursor to the oleophilic nucleation sites. The formation of the dispersion of oleophilic nucleation sites is accompanied by degradation of the hydrophilicity, i.e. the hydrophilic moiety, of the compound/surfactant.

The dispersion of oleophilic sites are essentially free of surfactant. Preferably, the degradation agent is added in an amount sufficient to obtain an aqueous medium essentially free of water-soluble hydrocarbon containing compound. By essentially free of hydrocarbon-containing compound/surfactant, whether it be hydrocarbon-containing surfactant, halogen-containing surfactant, such as fluorosurfactant, and any other surfactant is meant that (a) the hydrocarbon-containing compound/surfactant precursor to the nucleation sites loses hydrophilicity, and also surfactant effect in the case of surfactant, upon being degraded and (b) and essentially no additional surfactant is present in the aqueous medium during the formation of the oleophilic nucleation sites. Preferably, only a small amount of hydrocarbon-containing compound/surfactant is added to the aqueous medium during the initial period for degradation by the degradation agent. This small amount is quantified hereinafter. By essentially no additional surfactant is present is meant that such small amount should in combination with residual compound/surfactant, if any, not exceed 50 ppm. If the additional surfactant were halogen-containing such as fluorosurfactant, such amount added should preferably be no greater than 50 ppm, more preferably no more than 40 ppm, even more preferably, no greater than 30 ppm, most preferably less than 20 ppm, preferably less than 10 ppm, more preferably less than 5 ppm, if not hindering to the degradation reaction or appreciably detrimental to the performance of the nucleation sites as loci in the formation of fluoropolymer particles during the subsequent polymerization following kick off of the polymerization reaction. Preferably, no additional surfactant is present, i.e. no additional surfactant has been added to the aqueous medium prior to or during the formation of the oleophilic nucleation sites.

The performance of the nucleation sites can be judged by the small particle size of the fluoropolymer particles formed as compared to conducting the polymerization reaction without these nucleation sites being present. This performance indicates the presence of a dispersion of oleophilic nucleation sites prior to polymerization kickoff, as the precursor for the dispersion of fluoropolymer particles. The effect of the degradation reaction on the hydrocarbon-containing compound/surfactant is indicated by the reduction or elimination of telogenicity arising from severing of C—H bonds of the hydrocarbon moiety present in the hydrocarbon-containing compound/surfactant. Telogenicity is primarily the result of the reaction between the hydrocarbon-containing surfactant and free radicals in the polymerization system. In effect, the result of telogenicity is inhibition of the polymerization reaction.

There are many pathways that manifest telogenicity, but regardless of the pathway, telogenic behavior is the behavior which leads to a reduced number of growing polymer chains and thereby a reduced rate of polymer production and/or a significant reduction in polymer molecular weight.

To obtain the pre-kick off condition of the dispersion of oleophilic nucleation sites and essential absence of hydrocarbon-containing compound, preferably hydrocarbon-containing surfactant and any other surfactant from the dispersion, only a small amount (weight) of the hydrocarbon-containing compound/surfactant is used as the degradation precursor, e.g. no more than 50 ppm. All ppm amounts disclosed herein are with respect to the amount of water present at the time of the event, all on a weight basis. When the event is the formation of the dispersion of nucleation sites in the aqueous medium, the amount of water is that which is associated with this formation. In this case, ppm is based on the sum of the amounts of water added to the reactor up to the time when the dispersion of nucleation sites at least commences formation. For simplicity, this water may be referred to as aqueous medium. This water amount does not include after-added water such as in the form of the aqueous solutions of polymerization initiator added to cause polymerization kickoff and stabilizing surfactant used to stabilize the fluoropolymer particles formed after kickoff. The combination of a small amount of hydrocarbon-containing compound/surfactant together with the degradation of the hydrophilicity thereof provides the reduction or elimination of telogenicity.

A preferred embodiment of the present invention with respect to the dispersion of oleophilic nucleation sites in the aqueous medium, when formed by degradation of the hydrocarbon containing compound/surfactant, is as follows: At the time of the degradation or oxidation, water-soluble inorganic salt may preferably also be present in the aqueous medium to aid in the formation of the dispersion of hydrocarbon-containing oleophilic nucleation sites. The beneficial effect of the salt is to either (a) increase the number of oleophilic nucleation sites and thereby resulting in smaller fluoropolymer particles and/or (b) enable the amount of oleophilic nucleation sites formed from hydrocarbon-containing compound/surfactant to be reduced for a given particles size. With respect to (a), this decrease in fluoropolymer particle size is with respect to a given small amount of hydrocarbon-containing compound/surfactant present in the degradation reaction. With respect to (b), this enables a smaller amount of hydrocarbon-containing compound/surfactant to be present in the degradation reaction, thereby reducing the possibility for the product of the degradation reaction from inhibiting the subsequent polymerization reaction. The beneficial effect of the salt also excludes any salt that prevents benefit (a) or (b) from occurring, such as by the salt being degraded instead of the hydrocarbon-containing compound/surfactant.

The amount of this water-soluble inorganic salt to be added to the aqueous medium is that which is effective to provide beneficial result. This amount is also small so as not to adversely effect the performance of the oleophilic nucleation sites or the subsequent polymerization reaction. An adverse effect on the performance of the nucleation sites is to cause an undesirable increase in fluoropolymer particle size, believed to be the result of excessive salt causing the fluoropolymer particles to combine rather than grow from the oleophilic nucleation sites. An adverse effect on the polymerization reaction is to cause excessive amount of fluoropolymer coagulum to be formed. Coagulum consists of undispersible fluoropolymer formed during the polymerization and is the sum of fluoropolymer that is undispersed, e.g. irreversible agglomerates, and fluoropolymer that adheres to the interior wall of the polymerization reactor. Coagulum is discarded as waste. The beneficial effective amount of water-soluble inorganic salt added to the aqueous medium will vary with the hydrocarbon-containing compound/surfactant used as the precursor to the degradation reaction. Generally, this amount will be no greater than 125 ppm in the aqueous medium.

The preferred degradation agent of the hydrocarbon-containing compound/surfactant is water soluble polymerization initiator that is also useful for the polymerization of fluoromonomer. Polymerization initiator is not known to be harmful to the polymerization of fluoromonomer when used in the proper amount, whereby its introduction into the aqueous medium as a degradation agent to cause the oxidation of the hydrocarbon-containing compound/surfactant should not cause any problem in the subsequent polymerization reaction. Moreover, the amount of initiator used as the degradation agent is small, yet effective to result in the desired oxidation of the hydrocarbon-containing compound/surfactant to form the dispersion of oleophilic nucleation sites, e.g. no greater than 50 ppm. The amount of degradation agent/initiator, if any, remaining after the degradation of the hydrocarbon-containing compound/surfactant is preferably insufficient to cause kickoff of the polymerization reaction. Preferably, this insufficiency also applies to the amount of degradation agent/initiator added to the aqueous medium to cause the degradation reaction. This insufficiency preferably avoids premature polymerization, i.e. polymerization occurring during the pressuring up of the polymerization reactor with fluoromonomer, after which kickoff of the polymerization reaction occurs. Pressuring up the reactor is addition of fluoromonomer to the reactor to increase the reactor internal pressure to the pressure at which the polymerization reaction will commence and/or be carried out. Free-radical polymerization initiator is added to the aqueous medium in the pressured-up reactor to provide kickoff of the polymerization reaction. Thus, in a preferred embodiment wherein the degradation agent is polymerization initiator, two additions of polymerization initiator are carried out, the first addition of a small amount to degrade the hydrocarbon-containing compound/surfactant, without causing premature polymerization, and the second addition of sufficient amount(s) to cause the polymerization reaction to occur.

The water-soluble inorganic salt described above, if used, is preferably added to the aqueous medium prior to the degradation reaction, i.e. prior to addition of the initiator to the aqueous medium, so as to be present at the time of the degradation reaction between the degradation agent and the hydrocarbon-containing compound/surfactant in order to provide the beneficial effect described above.

The nucleation site formation step of the present invention leads to a process for polymerizing fluoromonomer having great latitude in the choice of polymerization conditions at kickoff and to the completion of the polymerization process. Such polymerization will of course require the addition of fluoromonomer to the polymerization reactor and presence of initiator in the aqueous medium to enable the kickoff to occur. Surfactant is also added to the aqueous medium to be present at or after kicking off of the polymerization reaction to stabilize the fluoropolymer particles as a dispersion in the aqueous medium within which they are formed. This surfactant will be referred to herein as the stabilizing surfactant to distinguish from the surfactant (nucleant surfactant) that is preferably used in the small amount to form the oleophilic nucleation sites in the process step preceding kickoff. The amount of stabilizing surfactant used and when it is added to the aqueous medium will depend on the identity of the stabilizing surfactant and the fluoropolymer being made. The stabilizing surfactant can be fluorine containing.

Preferably, the polymerization of the fluoromonomer is carried out using hydrocarbon-containing surfactant as the stabilizing surfactant. Preferably, the aqueous medium at kicking off of this polymerization in the presence of initiator is essentially free of all surfactant, including hydrocarbon-containing stabilizing surfactant, in the aqueous medium and this surfactant is added to the aqueous medium for the first time after the kicking off of the polymerization.

Preferred conditions for the formation of the dispersion of oleophilic nucleation sites and the stabilizing surfactant added after polymerization kickoff are as follows: The nucleation sites are the product of degrading of water-soluble hydrocarbon-containing compound that contains hydrophobic moiety and the stabilizing surfactant is also hydrocarbon-containing. Preferably, the hydrocarbon-containing compound is hydrocarbon-containing surfactant, and the nucleation sites are hydrocarbon containing. Most preferably, the hydrocarbon-containing compound is hydrocarbon compound or hydrocarbon surfactant, whereby the oleophilic nucleation sites are hydrocarbon, and the stabilizing surfactant is hydrocarbon surfactant, providing an entirely hydrocarbon nucleation/stabilization system for the aqueous dispersion polymerization of fluoromonomer. Preferably, no halogen-containing surfactant is added or is present in the aqueous polymerization medium in the reactor or in the reactor during the entire polymerization process.

The expression hydrocarbon-containing used herein means that the carbon atoms present in the hydrocarbon-containing compound/surfactant that could be substituted by halogen, such as fluorine or chlorine, are instead substituted by hydrogen. Accordingly, the monovalent substituents, as elements from the Periodic Table, on the carbon atoms of the compound or surfactant are at least 75%, preferably at least 85%, and more preferably at least 95% hydrogen. Most preferably, the compound or surfactant is a hydrocarbon compound containing the hydrophilic and hydrophobic moieties. Hydrocarbon means that 100% of the monovalent substituents as elements of the Periodic Table, on the carbon atoms are hydrogen. Thus, hydrocarbon compounds and surfactants described as such herein are free of halogen such as chlorine and fluorine. The discussion herein with respect to hydrocarbon-containing compound and hydrocarbon-containing surfactant, whether the degradation precursor to the oleophilic nucleation sites or the stabilization surfactant, apply to hydrocarbon compounds and hydrocarbon surfactants.

The present invention can also be described as a process for polymerizing fluoromonomer in an aqueous medium in a polymerization reactor to form a dispersion of fluoropolymer particles in the aqueous medium, comprising (i) providing the aqueous medium in the reactor, (ii) adding water-soluble hydrocarbon compound that contains hydrophobic moiety and hydrophilic moiety to the aqueous medium, (iii) exposing the compound to degradation, preferably oxidation, in the aqueous medium to degrade the hydrophilic moiety, thereby enabling the hydrophobic moiety to form a dispersion of hydrocarbon oleophilic nucleation sites in the aqueous medium, the dispersion of oleophilic nucleation sites being essentially free of surfactant, (iv) pressuring up the reactor with the fluoromonomer to the pressure at which the polymerizing is carried out, and (e) adding polymerization initiator to the aqueous medium to cause kicking off of the polymerizing of the fluoromonomer.

The polymerization of the fluoromonomer can be continued after polymerization kickoff in the aqueous medium in the presence of additional polymerization initiator, if needed, and an effective amount of stabilizing surfactant, preferably hydrocarbon surfactant, to stabilize the dispersion of fluoropolymer particles formed in the aqueous medium.

Preferably, this process has the additional feature of prior to step (iii), adding water-soluble inorganic salt to the aqueous medium to aid in the formation of the dispersion of oleophilic nucleation sites.

Preferably, the amount of the hydrocarbon compound added to the aqueous medium is no greater than 50 ppm and the amount of the salt added to the aqueous medium is no greater than 120 ppm.

Another preference is that the exposure to degradation is carried out by adding degradation agent to the aqueous medium and reacting the degradation agent with the hydrocarbon compound in the aqueous medium, the amount of the degradation agent being insufficient to cause the kicking off of the polymerizing of the fluoromonomer. Preferably, the amount of the degradation agent added to the aqueous medium is no greater than 50 ppm. Preferably, the degradation agent is polymerization initiator.

These preferences can be used separately or in combination.

DETAILED DESCRIPTION OF THE INVENTION

Fluoromonomer/Fluoropolymer

The term "fluoropolymer" has a collective meaning herein, i.e. it includes fluoroplastics and fluoroelastomers, unless otherwise indicated. This term also includes general and specific polymers that are fluoroplastics or fluoroelastomers, including perfluoroplastics as a specie of fluoroplastic, and the general and specific polymers disclosed below in this section, such as PTFE, PFA and FEP. Thus, the various preferences for conducting the polymerization process of the present invention for preparing a dispersion of fluoropolymer particles are also applicable to preparing a dispersion of any and all of the polymers, general and specific, included in the section below. The same is true for the various concentrations and identities of ingredients used to prepare the oleophilic nucleation sites and the essential freedom of the aqueous polymerization medium from hydrocarbon-containing compound/surfactant and halogen-containing surfactant Fluoropolymer aqueous dispersions formed by this invention are comprised of particles of fluoropolymer made from at least one fluorinated monomer (fluoromonomer), i.e., wherein at least one of the monomers contains fluorine, preferably an olefinic monomer with at least one fluorine or a perfluoroalkyl group attached to a doubly-bonded carbon. The fluorinated monomer used in the process of this invention and the fluoropolymer obtained therefrom each preferably contain at least 35 wt % F, preferably at least 50 wt % F and the fluorinated monomer is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether) and mixtures thereof. A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro (methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful for polymerizing when producing dispersions of polytetrafluoroethylene (PTFE) including modified PTFE in an aqueous medium. Polytetrafluoroethylene (PTFE) refers to (a) the polymerized tetrafluoroethylene by itself without any significant comonomer present, i.e. homopolymer and (b) modified PTFE, which is a copolymer of TFE with such small concentrations of comonomer that the melting point of the resultant polymer is not substantially reduced below that of PTFE. The modified PTFE contains a small amount of comonomer modifier which reduces crystallinity to improve processing, examples of such monomers being such as perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the molecule. The concentration of such comonomer is preferably less than 1 wt %, more preferably less than 0.5 wt %, based on the total weight of the TFE and comonomer present in the PTFE. A minimum amount of at least about 0.05 wt % is preferably used to have significant effect. PTFE (and modified PTFE) typically have a melt creep viscosity of at least about $1\times10^6$ Pa·s and preferably at least $1\times10^8$ Pa·s and, with such high melt viscosity, the polymer does not flow in the molten state and therefore is not a melt-processible polymer. The measurement of melt creep viscosity is disclosed in col. 4 of U.S. Pat. No. 7,763,680. The high melt viscosity of PTFE arises from is extremely high molecular weight (Mn), e.g. at least $10^6$. PTFE can also be characterized by its high melting temperature, of at least 330° C. (1st heating), usually at least 331° C. and most often of at least 332° C. (all $1^{st}$ heat). The non-melt flowability of the PTFE, arising from its extremely high melt viscosity, manifests itself as a no melt flow condition when melt flow rate (MFR) is measured in accordance with ASTM D 1238 at 372° C. and using a 5 kg. weight. This no melt flow condition is an MFR of 0. The high melt viscosity of the PTFE reduces the ability of the molten PTFE to reform the "as polymerized" crystal structure upon cooling from the first heating. As a result, this high melt viscosity leads to a much lower heat of fusion obtained for the second heat (e.g. up to 55 J/g) as compared to the first heat (e.g. at least 75 J/g) to melt the PTFE, representing a heat of fusion difference of at least 20 J/g. The high melt viscosity of PTFE enables its standard specific gravity (SSG) to be measured as a characteristic of extremely high molecular weight. The SSG measurement procedure (ASTM D 4894, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful in polymerizing low molecular weight PTFE, which is commonly known as PTFE micropowder, so as to distinguish from the PTFE described above. The molecular weight of PTFE micropowder is low relative to PTFE, i.e. the molecular weight (Mn) is generally in the range of $10^4$ to $10^5$. The result of this lower molecular weight of PTFE micropowder is that it has fluidity in the molten state, in contrast to PTFE which is not melt flowable. PTFE micropowder has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

While the low molecular weight of PTFE micropowder imparts melt flowability to the polymer, the PTFE micropowder by itself is not melt fabricable, i.e. an article molded from the melt of PTFE micropowder is useless, by virtue of extreme brittleness. Because of its low molecular weight (relative to non-melt-flowable PTFE), it has no strength. An extruded filament of PTFE micropowder is so brittle that it breaks upon flexing. Generally, compression molded plaques cannot be made for tensile or flex testing of the PTFE micropowder used in the present invention, because the plaques crack or crumble when removed from the compression mold, whereby neither the tensile property nor MIT Flex Life can be tested. In effect, this polymer has no (0) tensile strength and an MIT Flex Life of zero cycles. In contrast, PTFE is flexible, rather than brittle, as indicated e.g. by an the MIT flex life (ASTM D-2176, using an 8 mil (0.21 mm) thick compression molded film) of at least 1000 cycles, preferably at least 2000 cycles.

The invention is useful for producing dispersions of melt-processible fluoropolymers that are also melt-fabricable. Melt-processible means that the fluoropolymer can be processed in the molten state, i.e., fabricated from the melt using conventional processing equipment such as extruders and injection molding machines, into shaped articles such as films, fibers, and tubes. Melt-fabricable means that the resultant fabricated articles exhibit sufficient strength and toughness to be useful for their intended purpose. This sufficient strength may be characterized by the fluoropolymer by itself exhibiting an MIT Flex Life of at least 1000 cycles, preferably at least 2000 cycles, measured as described above. The strength of the fluoropolymer is indicated by it not being brittle. The fluoropolymers described hereinafter are melt processible and melt fabricable unless otherwise indicated.

Examples of such melt-processible fluoropolymers include homopolymers such as polychlorotrifluoroethylene and polyvinylidene fluoride (PVDF) or copolymers of tetrafluoroethylene (TFE) and at least one fluorinated copolymerizable monomer (comonomer) present in the polymer usually in sufficient amount to reduce the melting point of the copolymer substantially below that of PTFE, e.g., to a melting temperature no greater than 315° C.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min. Additional melt-fabricable fluoropolymers are the copolymers of ethylene (E) or propylene (P) with TFE or CTFE, notably ETFE and ECTFE.

A preferred melt-fabricable copolymer for use in the practice of the present invention comprises at least 40-99 mol % tetrafluoroethylene units and 1-60 mol % of at least one other monomer. Additional melt-fabricable copolymers are those containing 60-99 mol % PTFE units and 1-40 mol % of at least one other monomer. Preferred comonomers with TFE to form perfluoropolymers are perfluoromonomers, preferably perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFPNF$_2$).

Further useful polymers are film forming polymers of polyvinylidene fluoride (PVDF) and copolymers of vinylidene fluoride as well as polyvinyl fluoride (PVF) and copolymers of vinyl fluoride.

All these melt-fabricable fluoropolymers can be characterized by MFR as recited above for the melt-fabricable TFE copolymers, i.e. by the procedure of ASTM 1238 using standard conditions for the particular polymer, including a 5 kg weight on the molten polymer in the plastometer for the MFR determination of PFA and FEP. All of the fluoropolymers described above are fluoroplastics, including perfluoroplastics, not fluoroelastomers. Fluoroplastics do not have the basic characteristics of fluoroelastomers, i.e. the combination of low flex modulus, high elongation, and after crosslinking, rapid recovery from deformation. Fluoroplastics, including perfluoroplastics most often exhibit crystallinity and a melting temperature. Preferred fluoroplastics and perfluoroplastics have sufficient crystallinity that they have a heat of fusion by differential scanning calorimetry (DSC) of at least 9 J/gm as determined according to ASTM D-4591 or, if amorphous, such as TFE/PDD copolymer, have a glass transition temperature of 50° C. or greater.

The invention is also useful when producing dispersions of fluorocarbon elastomers (fluoroelastomers). These elastomers typically have a glass transition temperature below 25° C. and exhibit little or no crystallinity at room temperature and no melting temperature. Fluoroelastomer made by the process of this invention typically are copolymers containing 25 to 75 wt %, based on total weight of the fluoroelastomer, of copolymerized units of a first fluorinated monomer which may be vinylidene fluoride ($VF_2$) or tetrafluoroethylene (TFE). The remaining units in the fluoroelastomers are comprised of one or more additional copolymerized monomers, different from the first monomer, selected from the group consisting of fluorinated monomers, hydrocarbon olefins and mixtures thereof. Fluoroelastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluoroelastomer copolymers include TFE/PMVE, TFE/PMVE/E, TFE/P and TFE/P/$VF_2$. Preferred $VF_2$ based fluorocarbon elastomer copolymers include $VF_2$/HFP, $VF_2$/HFP/TFE, and $VF_2$/PMVE/TFE. Any of these elastomer copolymers may further comprise units of cure site monomer.

From the fluoroplastics disclosed above, the preferred fluoroplastics are the perfluoroplastics, these being the most difficult to make, because of their high molecular weight and susceptibility to telogenic activity being present in the aqueous polymerization medium preventing this high molecular weight from being obtained. This is especially true for PTFE, which has a molecular weight (Mn) of at least 1,000,000, usually in excess of 2,000,000 as compared to the much lower molecular weight of fluoroelastomers, which gain their strength from crosslinking. Perfluoroplastics are polymers in which the monovalent substituents on the carbon atoms forming the chain or backbone of the polymer are all fluorine atoms, with the possible exception of comonomer, end groups, or pendant group structure. Preferably the comonomer, end group, or pendant group structure will impart no more than 2 wt % C—H moiety, more preferably no greater than 1 wt % C—H moiety, with respect to the total weight of the perfluoroplastic. Preferably, the hydrogen content, if any, of the perfluoroplastic is no greater than 0.2 wt %, based on the total weight of the perfluoroplastic. Fluoroelastomers gain their dimensional integrity by crosslinking, whereby it is satisfactory if the polymerization process makes a lower molecular weight polymer, i.e. the presence of telogenic activity in the aqueous polymerization medium is more tolerable to make fluoroelastomer than PTFE. Polymerization to make PTFE is difficult because of its extremely high molecular weight as mentioned above. A special accomplishment of the present invention is its ability to make this high molecular weight PTFE using an entirely hydrocarbon-based nucleation/stabilization system, i.e. hydrocarbon compound/surfactant as the precursor to the nucleation sites and hydrocarbon surfactant as the stabilizing surfactant, i.e. no halogen-containing surfactant is used or is present in the aqueous polymerization medium.

Another group of preferred fluoroplastics are those in which the polymer chain is composed of greater than 75 wt % perfluoromonomer units, preferably TFE, HFP, and mixtures thereof, preferably at least 78 wt % of such recurring units, more preferably at least 80 wt % of such recurring units, and most preferably at least 85 wt % of such units. TFE is the preferred perfluoromonomer recurring unit. The remaining recurring units, to total 100 wt % of the copolymer, can be selected from C—H containing comonomer or halocarbon comonomer, preferably perfluoroolefins HFP and PAVE described above to form perfluoroplastics. Preferred fluoroplastics comprise 25 wt % VF2 or less, more preferably, 20 wt % or less, even more preferably 15 wt % or less.

Nucleation Site Formation Prior to Kickoff

In the practice of a preferred embodiment of the invention, the nucleation site formation can be carried out in a polymerization reactor. The reactor is equipped with stirrers for the aqueous medium within the reactor to provide eventual sufficient interaction between free-radicals and monomers such as TFE at and after kickoff of the polymerization reaction for desirable reaction rates and uniform incorporation of comonomers if employed in the polymerization reaction. The reactor preferably includes a jacket surrounding the reactor so that the reaction temperature may be conveniently controlled by circulation of a controlled temperature heat exchange medium.

In a typical process for forming the dispersion of oleophilic nucleation sites, the reactor is charged with deionized water that is deaerated as charged or is deaerated after charging to the reactor. Any additional water added to the reactor, such as that containing dissolved initiator, water-soluble hydrocarbon-containing compound, salt, or stabilizing surfactant is also deionized and deaerated. The oleophilic nucleation sites can conveniently be formed in-situ within this aqueous medium charged to the reactor by adding water-soluble hydrocarbon-containing compound/surfactant to the aqueous charge in the small amount desired. Preferably water-soluble inorganic salt is also added to this aqueous charge and these two compounds are mixed together. The water-soluble hydrocarbon-containing compound/surfactant can conveniently be converted to the oleophilic nucleation sites by degrading the hydrocarbon-containing compound/surfactant in the aqueous medium in the reactor and in the presence of the water-soluble salt. The salt is not necessarily affected by the degradation reaction. The presence of the ions derived from the salt in solution provide the beneficial effect described above. The degradation agent can be an oxidizing agent, which can conveniently be a small amount of water-soluble polymerization initiator added to the aqueous medium. The temperature of the aqueous medium will be at the temperature effective to cause the degradation reaction to occur and will generally be from 25 to 120° C., preferably 40 to 120° C., more preferably 50 to 120° C., even more preferably 60 to 120° C., and most preferably 70 to 120° C., and this same temperature can be the same or similar temperature at which polymerization is carried out. The temperature used will primarily depend on the temperature desired for the later polymerization step, which temperature will also be high enough for the degradation agent, preferably, polymerization initiator, to become reactive. The degradation reaction is carried out sufficiently to degrade the hydrophilic moiety of the hydrocarbon-containing compound/surfactant to enable the residue of the compound/surfactant to become oleophilic nucleation sites. The oleophilic nucleation sites although oleophilic are invisible in the aqueous medium. The formation of the dispersion of nucleation sites commences with the start of the degradation reaction. It is contemplated that this reaction may continue as the reactor is pressured up with fluoromonomer added to the reactor to achieve the reactor pressure desired for kickoff. Nucleation sites are present at the time polymerization of the fluoromonomer begins (at kick off) as locations for the fluoropolymer to precipitate.

The presence of the nucleation sites are confirmed by the subsequent polymerization result in producing a smaller size fluoropolyrrier particles than when the polymerization is carried out in the absence of the oleophilic nucleation sites to form the same amount of dispersed fluoropolymer particles, i.e., the same dispersed solids content in the aqueous medium. The greater the number of nucleation sites, the smaller the fluoropolymer particle size for a given amount (weight) of fluoropolymer particles formed by the polymerization reaction.

The water soluble hydrocarbon-containing compound/surfactant is selected to be responsive to the degradation reaction forming the oleophilic nucleation sites by a loss in hydrophilicity. The hydrocarbon-containing compounds that are surfactants are the hydrocarbon-containing surfactants, examples of which are presented below.

The surfactant has a hydrophilic portion and a hydrophobic portion on the same molecule. These can be either cationic, nonionic or anionic. A typical cationic surfactant has a positively charged hydrophilic portion such as an alkylated ammonium halide, such as alkylated ammonium bromide, and a hydrophobic portion such as a long chain fatty acid. An anionic surfactant has a negatively charged hydrophilic portion such as a carboxylate, sulfonate, or sulfate salt and a long chain hydrocarbon portion, such as alkyl, as the hydrophobic portion. A nonionic surfactant does not contain a charged group but has a hydrophobic portion that is typically a long chain hydrocarbon similar to the other two types of surfactants. The hydrophilic portion of the nonionic surfactant typically contains water soluble functionality such as a chain of ethylene ether derived from polymerization with ethylene oxide. Water solubility is due to hydrogen bonding of the ether oxygen atoms with protons from the water. In the stabilization context, surfactants stabilize polymer particles by coating the particles with the hydrophobic portion of the surfactant oriented towards the particle and the hydrophilic portion of the surfactant in the water phase. In the case of charged surfactants, some stability is also due to repulsion of the electrical charges between particles. Surfactants typically reduce surface tension significantly of the aqueous medium within which the surfactant is dissolved. In the context of the surfactant being a precursor to the formation of the dispersion of oleophilic nucleation sites, the hydrophobic and hydrophilic moieties are key parts of the surfactant but for different reason. The hydrophilic moiety imparts water solubility to the surfactant, and the hydrophobic moiety becomes the oleophilic nucleation sites upon degradation of the hydrophilicity of the surfactant. Preferred surfactants as precursor to the formation of the oleophilic nucleation sites are the ethoxy-containing surfactants. Typically such surfactants are the nonionic, cationic, and anionic surfactants, with nonionic surfactants being most preferred. Preferably the surfactant is the only precursor to the nucleation sites and is free of aromatic moiety.

The examples of surfactants discussed below, unless otherwise indicated are the nucleation precursor surfactants. These surfactants may be used alone or in combination.

Nonionic hydrocarbon nucleant surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit), polyethylene glycol monostearate (EO: 10 to 55) and polyethylene glycol monooleate (EO: 6 to 10).

Suitable nonionic nucleant hydrocarbon surfactants include octyl phenol ethoxylates such as the Triton® X series supplied by Dow Chemical Company:

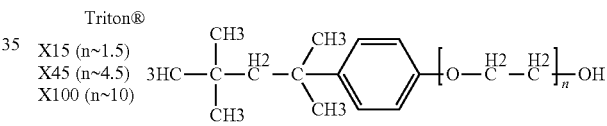

Preferred nonionic nucleant hydrocarbon surfactants are branched alcohol ethoxylates such as the Tergitol® 15-S series supplied by Dow Chemical Company and branched secondary alcohol ethoxylates such as the Tergitol® TMN series also supplied by Dow Chemical Company:

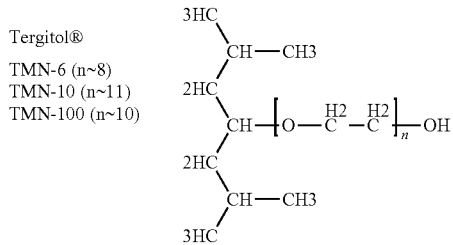

Ethyleneoxide/propylene oxide copolymers such as the Tergitol® L series surfactant supplied by Dow Chemical Company are also useful as nonionic nucleant surfactants in this invention.

Yet another useful group of suitable nonionic nucleant hydrocarbon surfactants are difunctional block copolymers supplied as Pluronic® R series from BASF, such as:

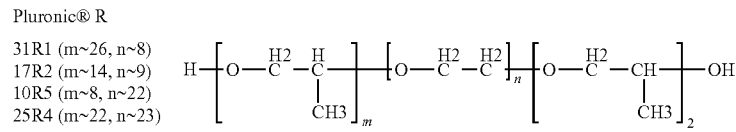

Another group of suitable nonionic nucleant hydrocarbon surfactants are tridecyl alcohol alkoxylates supplied as Iconol® TDA series from BASF Corporation.

Iconol®

TDA-6 (n = 6)
TDA-9 (n = 9)
TDA-10 (n = 10)

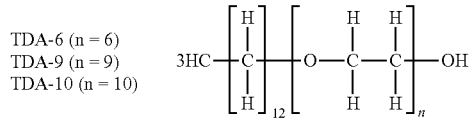

In another embodiment, the hydrocarbon nucleant surfactant is an anionic hydrocarbon surfactant. One such example is the highly branched C10 tertiary carboxylic acid supplied as Versatic® 10 by Resolution Performance Products.

Versatic® 10
Neodecanoic acid (n + m = 7)

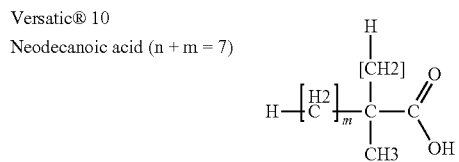

Another useful anionic nucleant hydrocarbon surfactant is the sodium linear alkyl polyether sulfonates supplied as the Avanel S series by BASF. The ethylene oxide chain provides nonionic characteristics to the surfactant and the sulfonate groups provide certain anionic characteristics.

Avanel®
S-70 (n = 7, m = 11-14)
S-74 (n = 3, m = 8)

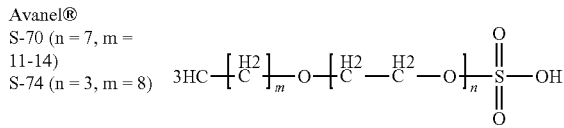

Another group of hydrocarbon nucleant surfactants are those anionic surfactants represented by the formula R-L-M wherein R is a straight chain alkyl group containing from 6 to 17 carbon atoms, L is selected from the group consisting of —$ArSO_3^-$, —$SO_3^-$, —$SO_4^-$—, —$PO_3^-$ and —$COO^-$, and M is a univalent cation, preferably selected from $H^+$, $Na^+$, $K^+$ and $NH_4^+$. —$ArSO_3^-$ is aryl sulfonate. Preferred of these surfactants are those represented by the formula $CH_3$—$(CH_2)_n$-L-M, wherein n is an integer of 6 to 17 and L is —$SO_3M$, —$PO_3M$ or —COOM and L and M have the same meaning as above. Especially preferred are R-L-M surfactants wherein the R group is an alkyl group having 12 to 16 carbon atoms and wherein L is sulfate, and mixtures thereof, such as sodium dodecyl sulfate (SDS). For commercial use, SDS (sometimes referred to as sodium lauryl sulfate), is typically obtained from coconut oil or palm kernel oil feedstocks, and contains predominately sodium dodecyl sulfate but may contain minor quantities of other R-L-M surfactants with differing R groups.

All of these surfactants have a hydrophilic moiety and a hydrophobic moiety which is oleophilic. The hydrophilic moiety predominates sufficiently so that the surfactant is water soluble in the concentration used to form the oleophilic nucleation sites.

Another group of nucleant surfactants that can be used as hydrocarbon-containing water soluble compounds are the hydrocarbon-containing siloxane surfactants. Such siloxane surfactants and polydimethylsiloxane (PDMS) surfactants in particular, are described in Silicone Surfactants, R. M. Hill, Marcel Dekker, Inc., ISBN: 0-8247-00104. The structure of the siloxane surfactant comprises defined hydrophobic and hydrophilic portions, the latter imparting water solubility to the surfactant. The hydrophobic portion comprises one or more dihydrocarbylsiloxane units, wherein the substitutions on the silicone atoms are entirely hydrocarbon:

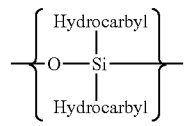

In the sense that the carbon atoms of the hydrocarbyl groups are entirely substituted with hydrogen atoms where they could be substituted by halogen such as fluorine, these siloxane surfactants can also be considered as hydrocarbon surfactants, i.e. the monovalent substituents on the carbon atoms of the hydrocarbyl groups are hydrogen The hydrophilic portion of the siloxane surfactant may comprise one or more polar moieties including ionic groups such as sulfate, sulfonate, phosphonate, phosphate ester, carboxylate, carbonate, sulfosuccinate, taurate (as the free acid, a salt or an ester), phosphine oxide, betaine, betaine copolyol, or quaternary ammonium salt. Ionic hydrophilic moieties may also comprise ionically functionalized siloxane grafts, including polyelectrolytes. Siloxane surfactants containing such groups include, for example, polydimethylsiloxane-graft-(meth)acrylic acid salts, polydimethylsiloxane-graft-polyacrylate salts and polydimethylsiloxane grafted quaternary amines.

The polar moieties of the hydrophilic portion of the siloxane nucleant surfactant may comprise non-ionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers.

The hydrophilic portion of the siloxane nucleant surfactant may also comprise combinations of ionic and nonionic moieties. Such moieties include, for example, ionically end-functionalized or randomly functionalized polyether or polyol. Preferred for the practice of this invention are siloxanes that have nonionic moieties, i.e., are nonionic siloxane surfactants.

The arrangement of the hydrophobic and hydrophilic portions of the structure of a siloxane surfactant may take the form of a diblock polymer (AB), triblock polymer (ABA), wherein the "B" represents the siloxane portion of the molecule, or multi-block polymer. The siloxane surfactant may alternatively comprise a graft polymer. The term "graft polymer" refers to a polymer comprising molecules with one or more species of polymeric functionality connected to the main polymer backbone as side chains, wherein the sidechains, or grafts, have structural or functional characteristics that differ from the characteristics of the main polymer backbone. Each graft of a polymeric functionality to the main polymer backbone is a "pendant" group. The structure of the graft may be linear, branched or cyclic.

Further details on siloxane surfactants are disclosed in U.S. Pat. No. 6,841,616 (Wille et al.), and representative examples of siloxane surfactants useful in the practice of the present invention are listed in Table 1 of this patent.

Examples of hydrocarbon surfactants that are siloxane-based and that are anionic are such surfactants available from Noveon® Consumer Specialties, a division of Lubrizol Advanced Materials, Inc., as follows:

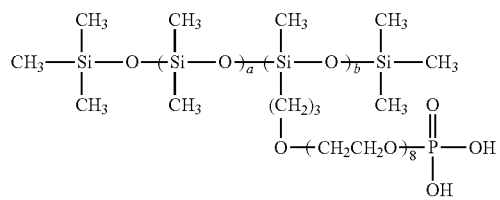

SilSense™ PE-100 Silicone

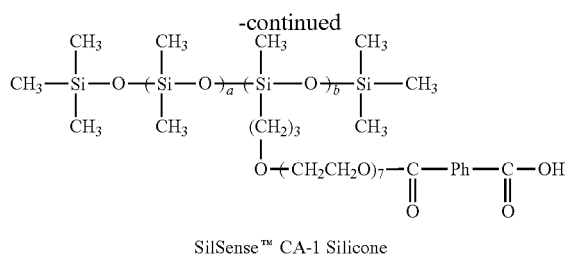

SilSense™ CA-1 Silicone

Another example of anionic hydrocarbon surfactant useful in the present is the sulfosuccinate surfactant Lankropol® K8300 available from Akzo Nobel Surface Chemistry LLC. The surfactant is reported to be the following:
Butanedioic acid, sulfo-, 4-(1-methyl-2-((1-oxo-9-octadecenyl)amino)ethyl) ester, disodium salt; CAS No.:67815-88-7.

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

The foregoing surfactants are both water soluble hydrocarbon compounds and hydrocarbon surfactants (collectively—hydrocarbon compounds/surfactants) in that all the carbon atoms present that could be substituted by fluorine are instead substituted by hydrogen. All of the monovalent substituents as elements of the Periodic Table on the carbon atoms are hydrogen. Instead of being free of halogen substituents, such as being fluorine free or chlorine free on these carbon atoms, a small number of carbon atoms as mentioned above can contain these halogen atoms. The preference, however, is that the water-soluble hydrocarbon-containing compound/surfactants mentioned above are hydrocarbon compounds/surfactants.

Examples of hydrocarbon-containing nucleant surfactants useful in the present invention in which only a minor number of monovalent substituents on carbon atoms are fluorine instead of hydrogen are the PolyFox® surfactants available from Omnova Solutions, Inc., described below

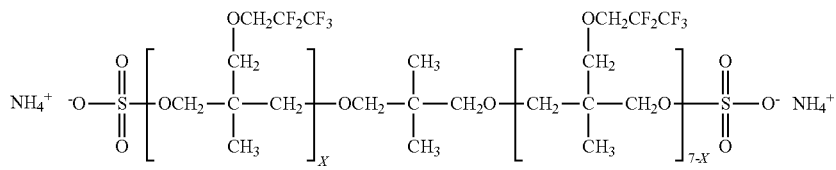

PolyFox™ PF-156A

MW~1900, X = 1 to 7

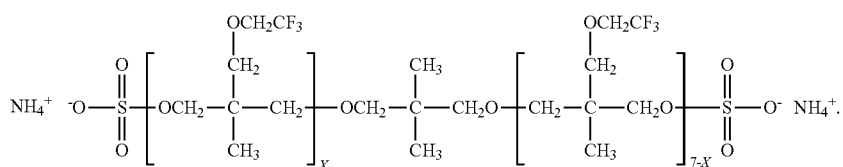

PolyFox™ PF-136A

MW~1600, X = 1 to 7

The small amount of hydrocarbon-containing compound/surfactant and hydrocarbon compound/surfactant added to the aqueous medium to form the oleophilic nucleation sites is preferably no greater than 50 ppm, preferably no greater than 40 ppm, even more preferably, no greater than 30 ppm, and most preferably no greater than 20 ppm, all based on the weight of water in the aqueous medium present at the formation of the nucleation sites. The ppm amounts of oleophilic nucleating sites present in the aqueous medium would be less than the ppm amounts disclosed herein as being added to the aqueous medium by virtue of the oxidation reaction degrading the hydrophilic moiety. The same is true for the hydrocarbon-containing compound after degradation, it no longer being the originally added compound. Thus, the amount of nucleation sites would be less than the 50 ppm, 40 ppm, 30 ppm, and 20 ppm amounts, respectively, mentioned above. Since it is believed that nucleation sites exist as molecules, only a small amount of hydrocarbon-containing compound/surfactant or hydrocarbon compqund/surfactant can produce a large amount of oleophilic nucleation sites. Thus, addition of as little as 1 ppm of such compound/surfactant to the aqueous medium can provide beneficial effect.

Examples of water-soluble inorganic salts that act to aid in the nucleation site forming process include those containing alkali metal cations such as Na and K or $NH_4^+$ and anions such as —$SO_3^-$, —$HSO_3^-$, —$NO_3^-$, —$CL^-$, —$CO_3^-$, —$B_4O_7^-$, and —$HPO_4^-$. When the fluoropolymer being made by polymerization is to be fabricated by melt extrusion, the salt is preferably an ammonium salt.

The salt is selected such that it is effective to provide the beneficial effect mentioned above and neither deactivates the initiator, thereby preventing the degradation reaction from occurring, nor reacts with the initiator to prevent the initiator from reacting with the hydrocarbon-containing compound/surfactant, nor inhibits the eventual polymerization. Thus, a smaller amount of hydrocarbon-containing compound/surfactant can be used for forming the oleophilic nucleation sites than if no salt were used. This is especially important in the polymerization process for making the highest molecular weight fluoropolymer, PTFE. The salt may be a reducing agent, but is not necessarily so. The carrying out of the degradation or oxidation reaction between the hydrocarbon-containing compound/surfactant and the degradation agent, preferably polymerization initiator, in the presence of the water-soluble inorganic salt includes the possibility that the salt undergoes some transformation, such as an oxidation/reduction reaction, as well. It is apparent that the ionization of the salt in the aqueous medium has a positive affect on the formation of nucleation sites. If the amount of salt is too large, however, the result can be negative, i.e. a reduced number of nucleation sites and an increased fluoropolymer particle size. The amount when this conversion of positive to negative effect depends primarily on the salt, but generally this conversion occurs at greater than 125 ppm salt, based on the weight of water in the reactor at the time of forming the nucleation sites.

Generally, to provide benefit to the nucleation site forming process and not detriment either to it or subsequent polymerization of the fluoromonomer, the amount of water-soluble inorganic salt present in the aqueous medium at the time of the oxidation reaction, is preferably no greater than 100 ppm, preferably no greater than 75 ppm, even more preferably no greater than 50 ppm, and most preferably, no greater than 25 ppm, and preferably at least 1 ppm, Examples of water-soluble free-radical polymerization initiators that can be used as the degradation agent in the oleophilic nucleation forming step are those that will rapidly oxidize the water-soluble hydrocarbon containing compound/surfactant at the temperature of the aqueous medium achievable within the polymerization reactor to form the desired oleophilic nucleation sites. Rapid reaction is desired so that the resultant oleophilic nucleation sites, now existing in the aqueous medium that is essentially free of surfactant, can be available for the polymerization reaction as a dispersion. Preferred initiators for this purpose are the highly active water-soluble salts of inorganic initiators such as the inorganic peracids. Preferred initiators are the persulfate salts, e.g., ammonium persulfate or potassium persulfate. Preferred persulfate initiators are substantially free of metal ions and most preferably are ammonium salts. Additional initiators useful in the practice of this invention are water-soluble organic azo compounds such as azoamidine compounds.

Preferably the amount of degradation agent/initiator added to the aqueous medium to carry out the oxidation reaction is less than the amount that could cause kickoff of the eventual polymerization reaction to be carried out in the reactor. Such amount will depend on the molecular weight of the degradation agent/initiator used that preferably contains the peroxy —O—O— group. Too much degradation agent/initiator used as the degradation agent in the nucleation site-forming step may cause destabilization of the nucleation sites along with premature polymerization of fluoromonomer as it is added to the reactor for pressuring up to kick off, resulting in larger fluoropolymer particles being formed in the polymerization step. Thus, the amount of degradation agent/initiator is added to the aqueous medium is preferably no greater than 40 ppm, more preferably no greater than 30 ppm, even more preferably no greater than 20 ppm, and most preferably no greater than about 15 ppm, based on the weight of the water in the reactor at the time of the nucleation site forming step. The minimum amount of degradation agent/initiator added to the aqueous medium can be as little as 1 ppm. The ppm amount of degradation agent/initiator present in the aqueous medium after formation of the dispersion of nucleation sites will be less than the ppm amounts disclosed herein as being added to the aqueous medium by virtue of the degradation reaction causing degradation of the initiator. These amounts apply to degradation agents other than polymerization initiator as degradation agent.

Each of these amounts of hydrocarbon-containing compound/surfactant, water-soluble inorganic salt, and degradation agent mentioned above can be used in any combination of the amounts mentioned. Thus, the amount of degradation agent/initiator being insufficient to cause kickoff of polymerization of the fluoromonomer can be used with any of the amounts of hydrocarbon-containing compound/surfactant and salt mentioned above, and the amounts of compound/surfactant and a salt can be in any combination of the amounts thereof mentioned above. The same is true when the numerical amount of degradation agent/initiator is specified, e.g. no more than 50 ppm. By way of example, the following combination of ingredients can be added to the aqueous medium:

(a) no greater thM 40 ppm of the hydrocarbon containing compound/surfactant, accompanied by any of the following amounts of water-soluble inorganic salt (no greater than 125 ppm, 100 ppm, 75, ppm, 50 ppm, or 25 ppm), together with any of the following amounts of degradation agent/initiator (no greater than 50 ppm, 40 ppm, 30 ppm 20 ppm, or 15 ppm);

(b) no greater than 100 ppm of the water-soluble inorganic salt, accompanied by any of the following amounts of hydrocarbon-containing compound/surfactant (no greater than 50 ppm, 40 ppm, 30 ppm, or 20 ppm), together with any of the following amounts of degradation agent/initiator (no greater than 50 ppm, 40 ppm, 30 ppm 20 ppm, or 15 ppm); and (c) no greater than 30 ppm degradation agent/initiator, accompanied by any of the following amounts of hydrocarbon-containing compound/surfadtant (no greater than 50 ppm, 40 ppm, 30 ppm, or 20 ppm), together with any of the following amounts of water-soluble inorganic salt (no greater than 125 ppm, 100 ppm, 75, ppm, 50 ppm, or 25 ppm), etc.

In each of these combinations of amounts of each ingredient, at least 1 ppm of each ingredient is present. A preferred combination of these ingredients is no more than 20 ppm of the hydrocarbon-containing compound/surfactant together with no more than 100 ppm of the salt ingredient and with respect to the degradation agent/initiator, an amount that is insufficient to cause kickoff of polymerization of the fluoromonomer or no more than any of the following amounts 50 ppm, 40 ppm, 30 ppm 20 ppm or 15 ppm.

It is also preferred that essentially no reactive fluoromonomer be present in the reactor at least at the commencement of the nucleation site forming step and the concomitant formation of the dispersion of oleophilic nucleation sites, i.e. the formation of these sites is preferably in the absence of fluoromonomer that will react with the small amount of initiator used as the oxidant.

The following are several embodiments of the present invention:

In one embodiment of the present invention, the aqueous medium in which the dispersion of oleophilic nucleation sites are formed can be characterized as a polymerization precharge composition, wherein the aqueous medium contains the dispersion of oleophilic polymerization nucleation sites made from water-soluble hydrocarbon-containing compound/surfactant, the compound/surfactant containing hydrophilic moiety and hydrophobic moiety, the hydrophilic moiety providing water solubility to the compound, the hydrophobic moiety forming the oleophilic nucleation sites upon degradation of the hydrophilic moiety of the compound. The precharge nature of this composition means that it exists prior to kicking off of the polymerization reaction. This embodiment can be summarized as a polymerization pre-charge composition comprising an aqueous medium containing a dispersion of oleophilic nucleation sites for the polymerization, the sites being made from hydrocarbon-containing water-soluble compound containing hydrophilic moiety and hydrophobic moiety, the hydrophilic moiety providing solubility of the compound in the aqueous medium, the hydrophobic moiety forming the oleophilic nucleation sites upon degradation of the hydrophilic moiety. The compound is preferably a surfactant. Just as the amount of such compound/surfactant added to the aqueous medium can be no more than 50 ppm or no more than 40 ppm or no more than 30 ppm or no more than 20 ppm or no more than 15 ppm, the amount the amount of nucleation sites will be less than each of these amounts, respectively.

In another embodiment of the present invention, the pre-charge composition can also be characterized as a reaction mixture in an aqueous polymerization medium, comprising no greater than 50 ppm of water soluble hydrocarbon-containing compound/surfactant that contains hydrophobic moiety and hydrophilic moiety, no greater than 125 ppm of water-soluble inorganic salt, and no greater than 50 ppm of degradation agent added to an aqueous medium. This precharge composition can be heated to a temperature at which the degradation agent reacts with the compound/surfactant to degrade the hydrophilic moiety, whereby the hydrophobic moiety becomes a dispersion of oleophilic nucleation sites in the aqueous medium. The degradation agent is preferably a polymerization initiator. This embodiment can also be described as the polymerization pre-charge composition described under (a) above wherein the oleophilic nucleation sites are the result of adding the compound, an agent for degrading the compound to the aqueous medium, wherein the compound can be a surfactant and the degradation agent can be a polymerization initiator as described above. Preferably, the amounts of the compound and degradation agent added to the aqueous medium can each being no greater than 50 ppm. A water-soluble inorganic salt can also be present in the pre-charge composition, preferably prior to the formation of the oleophilic nucleation sites and preferably in an amount no greater than 120 ppm.

In another embodiment of the present invention, the process of making the oleophilic nucleation sites can be characterized by providing a reactor for polymerizing fluoromonomer and containing an aqueous medium, reacting in the aqueous medium a water soluble hydrocarbon-containing compound/surfactant that contains hydrophobic moiety and hydrophilic moiety, with degradation agent, preferably a polymerization initiator in any effective amount to degrade the hydrophilic moiety but not effective to cause polymerization of fluoromonomer during pressuring up of the reactor with the fluoromonomer, the degradation of the hydrophilic moiety enabling the hydrophobic moiety to become a dispersion of oleophilc nucleation sites for the polymerization of fluoromonomer. The reaction is preferably carried out in the presence of water-soluble inorganic salt as described above In another embodiment of the present invention, the process can also be characterized by adding (precharging) hydrocarbon-containing compound/surfactant that contains hydrophobic moiety and hydrophilic moiety and water-soluble inorganic salt, if any, to an aqueous polymerization medium, then adding degradation agent, preferably a polymerization initiator, to this aqueous medium and reacting the degradation agent with the hydrocarbon-containing compound/surfactant to form a dispersion of oleophilic nucleation sites from the hydrophobic moiety of the water soluble hydrocarbon-containing compound/surfactant.

Each of these embodiments are in the context of being prior to kicking off of the polymerization reaction, and the identity of the ingredients (compound/surfactant, salt, and degradation agent, preferably polymerization initiator), temperature of the reaction and their amounts can be any of these aspects as disclosed above, resulting in the dispersion of oleophilic nucleation sites, including the aqueous medium within which the dispersion is formed, being essentially free of surfactant. The kicking off of the polymerization reaction is preferably preceded by pressuring up the polymerization reactor with fluoromonomer to be polymerized and free-radical polymerization initiator being added to the aqueous medium in sufficient amount to cause the polymerization kickoff to occur.

In all of the compositions and embodiments mentioned above, the preferred hydrocarbon-containing compound/surfactant is hydrocarbon compound/surfactant. Thus, the preferred oleophilic nucleation sites are hydrocarbon oleophilic nucleation sites.

Kicking Off of the Polymerization Reaction

After the commencement of and/or formation of the dispersion of oleophilic nucleation sites in the aqueous medium in the polymerization reactor in the initial period, the reactor is pressured up with fluoromonomer to be polymerized by addition polymerization. The pressuring up occurs by injecting gaseous fluoromonomer, such as TFE, into the vapor space within the reactor that exists above the surface of the aqueous medium in the reactor. This injection is carried out to obtain the pressure within the reactor that is desired for at least commencing the polymerization reaction, which is usually the pressure at which the polymerization is carried out (operating pressure). Relatively inactive fluoromonomer such as HFP, which is intended for copolymerization in the polymerization reaction, such as with TFE, can already be present in the reactor prior to pressuring up with the more active fluoromonomer. Typical operating pressures for carrying out the polymerization reaction that will be used will be from 30 to 1000 psig (0.3 to 7.0 MPa), preferably from 1 to 800 psig (0.1 to 5.6 MPa). An aqueous solution of water-soluble free-radical polymerization initiator can then be pumped into the reactor in sufficient amount to cause kicking off of the polymerization reaction. This kickoff is the commencement of the polymerization reaction. For simplicity, proof of this commencement, can be indicated by a reduction in reactor pressure, e.g. by a pressure drop of 10 psi (69 kPa), indicating the commencement of fluoromonomer consumption in the polymerization process and thereby commencement of the polymerization reaction. This amount of pressure drop is taken as meaning that the pressure drop is caused by the consumption of fluoromonomer and not by temperature fluctuations within the reactor. One skilled in the art may rely on a smaller pressure drop if there is confidence that the smaller pressure drop is not just a variation in internal reactor pressure that is not the commencement of polymerization. One skilled in the art may rely on a different parameter altogether as indicating the commencement of the polymerization, For example, in a pressure demand system, reduction in reactor pressure is immediately compensated by the flow of monomer into the reactor to maintain pressure. In this system, the flow of a certain amount of pressure demand monomer into the reactor is considered to have indicated the commencement of the polymerization reaction. Whatever parameter is relied upon, the same parameter should be used from batch to batch so as to provide results, such as batch time, that are comparable.

The aqueous medium is stirred to obtain the polymerization reaction rate and uniform incorporation of comonomer, if present, desired. The stabilization period is preferably subsequent to the initial period. The timing and amount of adding, surfactant to stabilize the resultant-formed fluoropolymer particles will depend on the surfactant used. Stabilization of the dispersion of fluoropolymer particles means that these particles are dispersed within the aqueous medium during polymerization accompanied by stirring rather than agglomerating with one another to form coagulum. This dispersion persists upon completion of the polymerization reaction and the stirring is discontinued.

The aqueous medium is preferably essentially free of surfactant at the time of kickoff of the polymerization reaction, preferably there is little if any surface active compound present in the aqueous medium to interfere with the affinity of the dispersion of oleophilic nucleation sites for the precipitating fluoropolymer. Hydrocarbon-containing surfactant used in the small amount as a precursor to the oleophilic nucleation sites has essentially lost most of its surface activity in the conversion to these sites. Addition of stabilizing surfactant to the aqueous polymerization medium is essentially the first addition of surfactant for this purpose.

The water-soluble free-radical polymerization initiator added to the aqueous polymerization medium to cause the addition polymerization reaction to kick off, after pressuring up of the reactor with fluoromonomer, can be the same as or different from the initiator used as the degradation agent depending on the fluoromonomer being polymerized. In a preferred embodiment, the addition of polymerization initiator, if the initiator is also the degradation agent, to cause kickoff of the polymerization reaction is a second addition of the initiator to the aqueous medium, the first addition being the small amount need for the degradation of the hydrocarbon-containing compound/surfactant to cause formation of the oleophilic nucleation sites. Preferred free-radical polymerization initiators are the highly active water-soluble salts of inorganic initiators such as the inorganic peracids. Preferred initiators are the persulfate salts, e.g., ammonium persulfate (APS) or potassium persulfate (KPS). Preferred persulfate initiators are substantially free of metal ions and most preferably are ammonium salts. For polymerization of TFE to PTFE, the preferred initiator is organic peracid such as disuccinic acid peroxide (DSP), which requires a large amount to cause kickoff, e.g. at least 200 ppm, sometimes together with a highly active initiator, such as persulfate salt, in a smaller amount. If the degradation agent is APS and the kickoff initiator is DSP/APS, the initiator causing polymerization would in effect be different from the APS initiator used as the degradation agent. However, the APS component of the DSP/APS polymerization initiator would be the second addition of APS to the aqueous medium in the reactor. The references to activity by the polymerization initiator refers to the ability of the initiator to form free radicals capable of initiating polymerization in the aqueous polymerization medium at the temperature of the medium within the reactor, from 25, 40, 50, 60, or 70 to 120° C. as mentioned above. The selection of initiator and polymerization temperature is preferably matched so that the free-radicals arising from the initiator are caused by the temperature of the aqueous medium, whether the free radicals are thermally induced or their formation is assisted by the presence of promoter or reducing agent. The polymerization initiator is preferably free of alkali metal ion. The initiator added to cause kickoff can be supplemented by additional initiator as may be necessary as the polymerization reaction proceeds.

In the preferred polymerization step, the stabilization surfactant is hydrocarbon-containing, preferably hydrocarbon surfactant. The kickoff of the polymerization is carried out essentially in the absence of hydrocarbon-containing surfactant or hydrocarbon surfactant and the addition of the surfactant to the aqueous medium is preferably delayed. This delay is beneficial in reducing any telogenic effect of the stabilizing surfactant on the polymerization. This delay can be measured in terms of the concentration of fluoropolymer formed in the aqueous polymerization medium when addition of the stabilizing surfactant to the aqueous medium commences, and can be represented by the following equation:

$$\text{Concentration of fluoropolymer in wt \%} = ([A \div (B+A)]) \times 100,$$

wherein A is the weight of dispersed fluoropolymer formed before addition of the surfactant commences and B is the weight of water in the polymerization reactor at the time stabilizing surfactant addition commences. The water additions comprising B (in the equation above) to the reactor may include dissolved ingredients, such as initiator. For simplicity, the water additions are each considered to be entirely of water as indicated by the calculations of the concentration of perfluoropolymer shown in Example 1. All the fluoropolymer formed is considered to be in the aqueous medium. A can be determined by the amount (weight) of fluoromonomer consumed up until the time the surfactant addition commences, since no coagulum will have formed so early in the polymerization reaction. When the fluoromonomer is the monomer that maintains the pressure (operating) of the polymerization process within the reactor, the amount of fluoromonomer consumed is the amount charged to the reactor to maintain (makeup) this pressure until stabilizing surfactant addition commences. When comonomer is present and its amount is not determined by makeup to maintain pressure, it is assumed that the incorporation of the comonomer into the fluoropolymer is uniform The amount of polymer produced (A) can then be calculated by the consumed fluoromonomer, e.g. TFE, fed to the reactor divided by the quantity 1 minus the weight fraction of comonomer in the fluoropolymer. B is the sum of the weight of all water additions to the reactor until surfactant addition commences. Thus, B includes the weight of the initial amount of water charged to the reactor and all additional water charges, such as in the form of solutions of nucleant surfactant, salt (if present), degradation agent, initiator for kick off of the polymerization reaction, and additional initiator pumped into the aqueous medium up until the time stabilizing surfactant addition commences.

It has been found that premature addition of the hydrocarbon-containing stabilizing surfactant to the aqueous polymerization medium excessively inhibits the polymerizing of fluoromonomer to fluoropolymer. Thus it is preferred that the concentration of fluoropolymer in the aqueous polymerization medium is at least 0.6 wt % before the surfactant addition commences, more preferably at least 0.7, or at least 0.8, or at least 1 wt %. Even more preferably, the fluoropolymer concentration is at least 1.2 wt % and most preferably at least 1.6 wt %. For melt processable perfluoroplastics such as FEP and PFA, the concentration is preferably at least 2 wt %, and for PTFE, the concentration is preferably at least 1 wt %, more preferably at least 1.6 wt %. The maximum delay in commencing the metering of the stabilizing surfactant will depend on the fluoromonomer(s) being polymerized and the coagulum wt % considered acceptable for the solids content of the dispersion to be obtained.

Preferred hydrocarbon-containing stabilizing surfactants that can be used are the anionic surfactants described above with respect to the starting material nucleant surfactant(precursor) for the formation of oleophilic nucleation sites. The most preferred surfactants are the R-L-M surfactants, described above, especially sodium dodecyl sulfate. It has been found that the preferred use of nonionic hydrocarbon surfactant as the nucleant surfactant precursor for the oleophilic nucleation sites and preferably anionic hydrocarbon surfactant as the stabilizing surfactant in the polymerization step, with delayed addition thereof, results in an acceptable reaction rate, small particle sizes for the fluoropolymer particles, and low coagulum formation during the polymerization step.

When addition of the hydrocarbon-containing stabilizing surfactant, preferably hydrocarbon surfactant, begins with the delay such as mentioned above after kickoff of the polymerization, the metering is at a rate that reduces the telogenic activity of the stabilizing surfactant while maintaining surface activity to form a stable dispersion of fluoropolymer particles in the aqueous polymerization medium. Exemplary of the metering rate is 0.005 to 1.4 g/l-hr, more preferably, 0.005 to 1.0 g/l-hr, and even more preferably 0.01 to 0.8 g/l-hr. In the expression g/l-hr, g is the weight in grams of the surfactant by itself, l is the reactor volume in liters, and hr is the unit of time. The metering rates apply to the surfactant not to the aqueous solution within which the surfactant is present as added to the aqueous medium in the polymerization reactor. The time increments for the addition of the hydrocarbon-containing stabilizing surfactant are preferably at least every 20 minutes, preferably at least every 10 min, more preferably at least every 5 min, and/or most preferably, continuously, during the polymerization reaction. The amount of such surfactant added and its timing of addition will depend on the fluoromonomer(s) being polymerized. Too little surfactant results in increased coagulum, and too much surfactant slows down the polymerization reaction. Each of these metering rates can be used with each of the wt % concentrations mentioned above with respect to the commencement of the surfactant addition.

While the hydrocarbon-containing surfactants, especially the hydrocarbon surfactants, are the preferred stabilizing surfactants for use in the present invention, wherein no halogen-containing surfactant is used or present, it is contemplated that the surfactant required for stabilization of the fluoropolymer particles formed during the polymerization step can include a halogen-containing surfactant, such as a fluorosurfactant. Halogen-containing surfactants, including fluorosurfactants, are surfactants in which at least about 50% of the total number of halogen, including fluorine, plus hydrogen atoms substituted on carbon atoms in the surfactant are halogen atoms. More preferably, at least about 75% of the total number of halogen and hydrogen atoms in the halogen-containing surfactant are halogen atoms, most preferably at least about 90%. Perfluorinated surfactants (no hydrogen atoms substituted on carbon atoms) can be used in the stabilization (polymerization) step of the invention.

In one embodiment, the fluorosurfactant is a short chain fluoroacid or salt, which can be used alone or in combination with other surfactants. When used together with a other surfactants, the combination may provide the needed surface activity to stabilize high concentrations of dispersed fluoropolymer particles formed in the polymerization step. Exemplary of other materials aiding stabilization is long chain fluorosurfactant, or hydrocarbon-containing surfactant, preferably hydrocarbon surfactant. The use of hydrocarbon-containing surfactant minimizes the amount of fluorosurfactant that is needed for stabilization of the dispersion of fluoropolymer particles.

The short chain stabilization fluorosurfactant can be characterized by the formula:

$$[R^1\text{—}O_n\text{-L-A}^-]Y^+ \qquad (I)$$

wherein:
$R^1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;
$A^-$ is an anionic group selected from the group consisting of carboxylate, sulfonate, sulfonamide anion, and phosphonate; and
$Y^+$ is hydrogen, ammonium or alkali metal cation;
with the proviso that the chain length of $R^1$—$O_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of $R^1$—$O_n$-L- is 3 to 6 atoms. In accordance with one preferred form of the invention the chain length of $R^1$—$O_n$-L- is 4 to 6 atoms. In accordance with another preferred form of the invention the chain length of $R^1$—$O_n$-L- is 3 to 5 atoms. Most preferably, the chain length of $R^1$—$O_n$-L- is 4 to 5 atoms.

One class of stabilization fluorosurfactants is fluoroether acids or salts, i.e., wherein n is 1 in Formula I above. Such fluoroether acids or salts in the accordance with the invention are fluorosurfactants according to Formula I wherein: $R^1$ is a linear or branched partially or fully fluorinated alkyl group having 1 to 3 carbon atoms which may contain ether linkages; and L is an alkylene group selected from —CX($R^2$)—, wherein $R^2$ is fluorine or perfluoromethyl and X is hydrogen or fluorine, and —$CZ^1Z^2CZ^3Z^4$—, wherein $Z^1$, $Z^2$, $Z^3$, and $Z^4$ are independently selected from hydrogen or fluorine.

In another embodiment, L in Formula I is an alkylene group selected from —CF(CF$_3$)—, —CF$_2$—, —CF$_2$CF$_2$—, —CHFCF$_2$—, and —CF$_2$CHF—.

The stabilization fluorosurfactant may be a diether if R1 or L contains an ether linkage. Such compounds are made, for example, by the teachings in WO 01/46116 A1 (Hintzer et al.) Preferred fluoroether acids or salts are fluoromonoethers where $R^1$ and L do not contain ether linkages.

In still another embodiment, $R^1$ in Formula I is a linear partially or fully fluorinated alkyl group having 2 to 3 carbon atoms. $R^1$ can be fully fluorinated.

In another embodiment of the invention, the fluorosurfactant is a compound of the formula:

$$[CF_3CF_2CF_2OCF(CF_3)COO^-]Y^+ \qquad (II)$$

wherein $Y^+$ is hydrogen, ammonium, or alkali metal cation. This is a compound is represented by Formula I wherein $R^1$ is $CF_3CF_2CF_2$—; L is —CF(CF$_3$)—; $A^-$ is carboxylate; and $Y^-$ is hydrogen, ammonium or alkali metal cation. Preferably, $Y^+$ is hydrogen or ammonium.

In another embodiment of the invention, the fluorosurfactant is a compound of the formula:

$$[CF_3CF_2OCF(CF_3)COO^-]Y^+ \qquad (III)$$

wherein $Y^+$ is hydrogen, ammonium, or alkali metal cation.

In another embodiment of the invention, the fluorosurfactant is a compound of the formula:

$$[CF_3CF_2CF_2OCF_2CF_2COO^-]Y^+ \qquad (IV)$$

wherein $Y^+$ is hydrogen, ammonium, or alkali metal cation.

In another preferred embodiment of the invention, the fluorosurfactant is a compound of Formula I wherein n is 0 and $R^1$; L collectively comprises a perfluoroalkyl group having 4-6 carbons; and $A^-$ is sulfonate and sulfonamide anion. In a preferred embodiment of this form of the invention, $A^-$ is sulfonamide anion, the sulfonamide compound of Formula IV below:

$$[CF_3CF_2SO_2N^-CH_2CH_2OH]Y^{++} \quad (V)$$

wherein $Y^+$ is hydrogen, ammonium, or alkali metal cation. A surfactant of this formula as the ammonium salt is available commercially from 3M under the trademark NOVEC™ 4200.

In accordance with another embodiment of the invention, the fluorosurfactant is a compound of the formula:

$$[CF_3CF_2CF_2CF_2CH_2CH_2SO_2^-]Y^+ \quad (VI)$$

wherein $Y^+$ is hydrogen, ammonium, or alkali metal cation. Further details on these short chain fluorosurfactants is disclosed in U.S. Pat. No. 7,705,074 (Brothers et al.). Examples of long chain fluoropolyether acids or salts that can be used in combination with the short chain fluorosurfactant are also disclosed in this patent. Preferably, the fluoropolyether is a perfluoropolyether acid or salt thereof. The acid groups of the fluoropolyether acid or salt thereof preferably are acid groups selected from carboxylic acid, sulfonic acid, sulfonamide, phosphonic acid. In preferred embodiments, the acid group of the fluoropolyether acid or salt is carboxylic acid. Preferably, the fluoropolyether acid is employed as a salt during polymerization, most preferably, an ammonium salt.

Preferred perfluoropolyether (PFPE) acids or salts thereof can have any chain structure in which oxygen atoms in the backbone of the molecule are separated by saturated fluorocarbon groups having 1-3 carbon atoms. More than one type of fluorocarbon group may be present in the molecule. Representative structures have the repeat unit represented in the following formulas:

$$(-CFCF_3-CF_2-O-)_n \quad (VII)$$

$$(-CF_2-CF_2-CF_2-O-)_n \quad (VIII)$$

$$(-CF_2-CF_2-O-)_n-(-CF_2-O-)_m \quad (IX)$$

$$(-CF_2-CFCF_3-O-)_n-(-CF_2-O-)_m \quad (X)$$

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, have 2 or 3 carbon atoms. Even more preferably, at least 50% of the fluorocarbon groups separating ether oxygens have 2 or 3 carbon atoms. Also, preferably, the PFPE has a total of at least 15 carbon atoms, e.g., the preferred minimum value of n or n+m in the above repeat unit structures is at least 5. More than one PFPE having an acid group at one or both ends can be used in a process in accordance with the invention. Typically, unless extraordinary care is employed to manufacture a single specific PFPE compound, the PFPE may contain multiple compounds in varying proportions within a molecular weight range about the average molecular weight.

The fluoropolyether acid or salt thereof has an average molecular weight which enables it to function in combination with fluoromonoether acid or salt as a polymerization agent in a process in accordance with the present invention. The number average molecular weight of the fluoropolyether acid or salt employed in accordance with this embodiment of the present invention is greater than about 800 g/mol. Fluoropolyether acids or salts with a number average molecular weight of greater than about 800 g/mol are defined in this patent application to be "polymeric fluoropolyethers". The number average molecular weight of the fluoropolyether acids or salts employed is usually less than about 6000 g/mol because fluoropolyether acids or salt with very high molecular weights generally are difficult to disperse in the aqueous polymerization medium. More preferably, the fluoropolyether acid or salt thereof employed in accordance with the invention has a number average molecular weight of about 800 to about 3500 g/mol, and most preferably 1000 to about 2500 g/mol.

The hydrocarbon-containing surfactants, preferably hydrocarbon surfactants, mentioned above as precursor for the oleophilic nucleation sites can be used in combination with the short chain or long chain fluorosurfactant as the stabilizing surfactant.

When the short chain fluorosurfactant is used by itself or in combination with long chain fluoropolyether acid or salt as the stabilizing surfactant, no delay is necessary in the addition of this combination to the aqueous medium, i.e. this combination can be added to the aqueous medium so as to be present at kickoff. When hydrocarbon-containing surfactant is used as the stabilizing surfactant in combination with the short chain or long chain fluorosurfactant, it is preferred that the addition at least of the hydrocarbon-containing stabilizing surfactant be delayed as mentioned above until after kickoff.

The amount and identity of fluoromonomer present at kickoff will depend on the fluoropolymer being made. In the case of modified PTFE, the modifying monomer will generally all be added at the time of the precharge to the reactor. The same can be true for comonomer used in the polymerization with TFE to form melt processible fluoropolymers, although comonomer can be added as the polymerization reaction proceeds. Once polymerization begins, additional TFE (and comonomer, if any) is added to maintain the reactor pressure desired. Chain transfer agents can be added when molecular weight control is desired. Paraffin wax, which is insoluble in the aqueous medium, is typically employed as a scavenger for coagulum within the aqueous medium during the polymerization to make PTFE, and is typically added to the precharge to the reactor. Succinic acid may also be added to the aqueous medium to reduce coagulum formation.

The polymerization medium is preferably substantially free of fluoropolymer seed at polymerization kick-off. The polymerization sites are formed by the oleophilic nucleation sites as described above, not by polymerization seeds of at least one of the fluoromonomers being polymerized. In this preferred form of the invention, fluoropolymer seed, i.e., separately polymerized small fluoropolymer particles in dispersion form, are not added to the aqueous medium.

For some polymerizations, additional initiator and/or stabilizing surfactant may be added during the polymerization.

After completion of the polymerization (typically several hours) when the desired amount of polymer or solids content has been achieved, agitation is discontinued and the feeds are stopped, thus stopping the polymerization reaction. The reactor is vented, and the raw dispersion of fluoropolymer particles in the reactor is transferred to a cooling or holding vessel. The formation of the dispersion of oleophilic nucleation sites, followed by kicking off of the polymerization reaction and its carrying out to completion of the reaction will typically be a batch process.

The solids content of fluoropolymer dispersion produced by the process of the invention is preferably at least about 10% by weight, preferably at least 16 wt %. Preferably, the fluoropolymers solids content is at least about 20% by weight. Solids content is the weight % of fluoropolymer particles dispersed in the aqueous medium, based on the total weight of the dispersed fluoropolymer particles plus the total weight of water in the reactor. The preferred particle size (Dv(50)) of the fluoropolymer particles in the aqueous dispersion thereof is preferably 100 to 300 nm. The principal limitation on solids content is the formation of coagulum; the higher the solids content, the greater the tendency to form increased amount of coagulum.

Preferably coagulum is no greater than 5 wt % of the total amount of fluoropolymer made. In the preferred process of the invention, polymerizing produces no greater than 3 wt %, even more preferably no greater than 2 wt % or 1 wt %, most preferably no greater than 0.5 wt % coagulum. Most preferably, the coagulum is less than each of these amounts. The maximum solids content is preferably controlled to minimize coagulum to an amount described above. Wt % coagulum= [wt of coagulum/total polymer produced]×100. Total polymer produced is the combined weight of the coagulum and the dispersed fluoropolymer particles. All weights are measure of dry polymer.

The as-polymerized dispersion can be transferred to a dispersion concentration operation which produces concentrated dispersions stabilized typically with nonionic hydrocarbon surfactants by known methods. Hydrocarbon-containing surfactant can be used for this purpose because polymerization has been completed. Solids contents of concentrated dispersion is typically about 35 to about 70% by weight. Alternatively, for use as a molding resin, a fluoropolymer resin is isolated from the dispersion usually by coagulation and the aqueous medium is removed. The fluoropolymer is dried then processed into a convenient form such as flake, chip or pellet for use in subsequent melt-processing operations. Certain grades of PTFE dispersion are made for the production of fine powder. For this use, the dispersion is coagulated, the aqueous medium is removed and the PTFE is dried to produce fine powder.

Passivation of the Hydrocarbon-Containing Stabilizing Surfactant

Passivation of the hydrocarbon-containing surfactant added to the polymerization reactor to stabilize the dispersion of fluoropolymer particles in the aqueous medium in the reactor reduces the telogenicity of the surfactant. The passivation is carried out by oxidizing the surfactant, preferably in the presence of a passivation adjuvant. The oxidation reaction involves exposure of the surfactant to an oxidizing agent in an aqueous medium which can be the same or different from the aqueous medium in the polymerization reactor within which the polymerization reaction is conducted. It is also preferred that the passivated stabilizing surfactant is anionic.

In one embodiment, the stabilizing surfactant as added into the aqueous polymerization medium in the polymerization reactor is passivated prior to addition into the aqueous medium. Preferably, the passivated stabilizing surfactant is the reaction product of this surfactant and an oxidizing agent such as hydrogen peroxide. The reaction forming this reaction product is preferably conducted in an aqueous medium at a temperature of no greater than 50° C. This temperature of reaction is in contrast to the temperature of the aqueous medium within which the polymerization reaction is most often carried out, i.e. at a temperature of at least 60° C.

The reduction in telogenicity of the stabilizing surfactant resulting from passivation provides improvements including one or more of the following: 1) reducing the polymerization time to produce the desired fluoropolymer solids content in the aqueous medium, without any appreciable increase in coagulum and/or 2) reducing the time of delay after polymerization kickoff before the stabilizing surfactant can be added to the aqueous medium as will be further discussed hereinafter. Thus, passivation increases the effectiveness of the surfactant. While telogenicity is reduced by passivation, the passivated surfactant still performs its surfactant function of stabilizing the dispersion of fluoropolymer particles in the aqueous medium.

Passivation can be carried out by reacting the stabilizing surfactant with hydrogen peroxide in aqueous solution. A water-soluble passivation adjuvant for the oxidation reaction is preferably also used to accelerate (catalyze) the oxidation reaction, This adjuvant is preferably metal ion that is preferably provided in a form which is soluble in the aqueous medium in the polymerization reactor. This solubility can be achieved by the metal ion being in salt form, i.e. the metal ion is the cation of the salt. Preferably the salt is inorganic and the anion of the salt can be any anion that provides this solubility, with or without water of hydration included in the salt. The anion, however, should not have an adverse effect on the polymerization reaction or fluoropolymer product. Examples of preferred anions of the metal salt include sulfate, sulfite, and chloride.

Preferably, the metal of the metal ion has multiple positive valences, sometimes referred to as multiple oxidation states. Examples of metal ion catalysts for the oxidation with hydrogen peroxide include Fe, Mn and Cu.

Even with acceleration, the oxidation reaction is slow, taking for example at least 30 minutes to completion. A procedure for carrying out the oxidation can be as follows: A solution of the stabilizing surfactant in water is formed. The $Fe^{+2}$ metal ion as iron sulfate hydrate passivation adjuvant is added and dissolved in this solution. The pH of the solution can be adjusted by addition of appropriate reagent to promote the oxidation reaction. The solution is agitated and hydrogen peroxide is slowly added to the solution. The weight ratio of peroxide, to $Fe^{+2}$ can be generally from 20:1 to 400:1, preferably from 30:1 to 300:1 and more preferably from 60:1 to 200:1. The weight ratio of peroxide to stabilizing surfactant, such as SDS, can be from 0.15:1 to 3.5:1, preferably from 0.3:1 to 2.6:1, and more preferably, from 0.5:1 to 1.6:1. Upon completion of the hydrogen peroxide addition, the resultant aqueous solution can be used for adding the passivated surfactant to the aqueous polymerization medium during the polymerization reaction in the manner described above. Thus, the water of the aqueous solution is preferably deaerated and deionized, as is done for the aqueous polymerization medium, so that the water added to the reactor along with the passivated surfactant is not detrimental to the polymerization reaction or the fluoropolymer obtained. These proportions of reactants and passivation adjuvant, if present, apply to the passivation of any and all the hydrocarbon-containing surfactants, including hydrocarbon surfactants, mentioned above for stabilization of the fluoropolymer particle dispersion.

When prepared separately from the aqueous polymerization medium, the passivated surfactant is uniform in its composition within the aqueous solution within which the passivation reaction is carried out. This means that the composition of the passivated surfactant fed into the reactor aqueous medium is the same at the end of the polymerization reaction as the composition at the commencement of its feed to the reactor.

Use of hydrogen peroxide to passivate the stabilizing surfactant does not create any salt that would accompany the feed of the passivated surfactant solution to the reactor. Salt when present in sufficient amount during the polymerization reaction can be detrimental, such as by causing increased coagulum.

The temperature of the aqueous solution within which the passivation reaction is carried out using hydrogen peroxide as the oxidizing agent is important. The preferred temperature range that is effective for causing the peroxide to react oxidatively with the stabilizing surfactant is 1 to 50° C., preferably 5 to 45° C. and most preferably 10 to 45° C. As the temperature increases from 45° C., reactivity falls off sharply and is virtually non-existent at temperatures above 50° C. Thus, the desired passivation effect is not obtained at the usual polymerization temperatures of 60° C. and higher. The passivation reaction using hydrogen peroxide is therefore preferably carried out separately from the aqueous polymerization medium.

The passivation effect is determined by conducting the oxidation reaction between the stabilizing surfactant and hydrogen peroxide at different aqueous solution temperatures and thereafter using the passivated surfactant as the stabilizing surfactant added to the aqueous polymerization medium in the polymerization of fluoromonomer, and comparing the polymerization (batch) times required to obtain a given fluoropolymer solids content in the aqueous polymerization medium. Preferably the passivation is effective such that the batch time is decreased by at least 10%, preferably at least 20%, more preferably at least 35% and most preferably at least 50% as compared to the same polymerization wherein the stabilizing surfactant is not passivated. Another measure of increased productivity of the polymerization process is increased space-time-yield (STY) of the polymerization reaction. In STY, space is the volume of the reactor, time is the time from kickoff of the polymerization reaction until its completion, and yield is the weight of dispersed polymer formed. STY is expressed herein as gm (of dispersed polymer)/l-hr. In Experiments 1 and 2 of Table 1 of Example 10, the batch time decreases by about 66% and the STY increases by about 300%

In another embodiment, the stabilizing surfactant is passivated prior to, during or after addition to the aqueous medium in the polymerization reactor using a different oxidizing agent than hydrogen peroxide, each of these being preferred timing for the passivation reaction. In effect, this timing of the passivation is the passivation outside the reactor and inside the reactor. Passivation most preferably occurs after the surfactant enters the reactor, so the passivation in the aqueous medium occurs within the reactor. In this embodiment, the passivated stabilizing surfactant is the reaction product of this surfactant and as the oxidizing agent, water-soluble polymerization initiator, preferably the initiator being used to cause the polymerization reaction to form the dispersion of fluoropolymer particles in the aqueous medium.

Preferably, this passivation reaction is carried out in the presence of passivation adjuvant, which is preferably metal ion supplied to this reaction in the form described above with respect to the metal ion used to catalyze the reaction between hydrogen peroxide and the stabilizing surfactant.

Experimentation has shown that the presence of the metal ion can also reduce batch time by 66% (see Experiments 1 and 2 in Table 1) of Example 10.

Preferred metal ions include those of Groups 2-12 of the Periodic Table of the Elements. Such Periodic Table is that which is disclosed on the back of the front cover of M. S. Silverberg, *Chemistry, The Molecular Nature of Matter and Change*, 5 Ed., published by McGraw-Hill Higher Education (2009). The Group numbering for this Table is 1 to 18 in accordance with 2010 IUPAC format, sometimes called "new notation". This Group numbering is referred to herein. This Group numbering applies to vertical columns of elements in the Periodic Table.

The most preferred metal ions are the transition metals, notably those in Groups 3-12 and of these, the most preferred are those in Groups 6-12, even more preferred Groups 7-12 and most preferred those in Groups 7-11. The Periodic Table also has horizontal grouping of elements called Periods that are numbered 1-7, starting with H of the Group 1 elements and ending with Fr of the Group 1 elements as Period 7. Among the transition metals, those in the horizontal Period 4 are most preferred. Included in the term "transition metals" are the "inner transition metal, i.e., the lanthanides and the actinides.

Preferred transition metals include Mn, Fe, Co, Ni, Cu, Zn, Ce, and Ag, with Fe and Cu being most preferred. One of the characteristics of most of the transition metals preferably used in the present invention is that they have multiple positive valences, sometimes referred to as multiple oxidation states. Fe, for example has valences of +2 and +3, and Cu has valences of +1 and +2. The most preferred metal ions are ferrous ion and cuprous ion. The metal ions used to catalyze the polymerization initiator/stabilizing surfactant oxidation reaction can also be used to catalyze the oxidation of the stabilizing surfactant in general.

The salt providing the metal ion is added to the aqueous medium in the polymerization reactor as an aqueous solution together with the aqueous solution of hydrocarbon-containing surfactant or independent therefrom, metered into the aqueous medium along with metering of the surfactant into the aqueous medium, metered independently into the aqueous medium, or added all at one time to the aqueous medium. If the polymerization reaction is preceded by the formation of oleophilic nucleation sites as will be described hereinafter, the addition of the passivation adjuvant as metal ion to the aqueous medium is preferably delayed until after the formation of these sites has at least commenced to avoid the formation of excessive coagulum. Thus, addition of the metal ion as passivation adjuvant to the aqueous medium is preferably delayed until after commencement (kickoff) of the polymerization reaction.

The rapidity of the oxidation reaction using polymerization initiator together with passivation adjuvant, enables this passivation reaction to be carried out prior to, during or after addition of the stabilizing surfactant to the aqueous medium in the polymerization reactor. The "prior to" passivation oxidation reaction can be carried out in the holding vessel for the aqueous solution of the stabilizing surfactant, by adding the passivation adjuvant and polymerization initiator to this vessel. The "during" passivation oxidation reaction can be carried out by co-feeding aqueous solutions of the stabilizing surfactant, passivation adjuvant, and polymerization initiator together into the reactor such that these solutions intermix during the addition to the reactor. The oxidation reaction during this intermixing is believed to at least commence if not be completed, depending of the length of the reactor feed line containing all three ingredients. The "after" passivation reaction, i.e. passivation within the aqueous medium in the polymerization reactor, is described in the preceding paragraph.

In both passivation embodiments, the hydrocarbon-containing surfactant, including hydrocarbon surfactant, is passivated by reacting the surfactant with an oxidizing agent. In both passivation reactions, the oxidation reaction is preferably carried out in the presence of passivation adjuvant, which is preferably metal ion, in the aqueous medium, which catalyzes the oxidation reaction. The metal ion preferably has multiple positive valences, and the preferred metal ions will depend on which oxidizing agent is used as described above. In this regard, the preferred oxidizing agents are hydrogen peroxide or water-soluble polymerization initiator, preferably selected from those disclosed in the section entitled Kicking Off of the Polymerization Reaction.

The passivation adjuvant used in the process of the present invention is preferably very small. For example, the concentration of passivation adjuvant, which can be metal ion, is preferably no greater than 2 wt %, based on the weight of the hydrocarbon-containing surfactant in the aqueous medium at the completion of the polymerization reaction. When the surfactant and metal ion are added together in aqueous solution, the same concentration of passivation adjuvant in the solution would apply. The amount of passivation adjuvant, which can be metal ion, in the aqueous medium upon completion of polymerization is preferably no greater than 25 ppm, based on the amount of water present in the reactor upon completion of the polymerization. These amounts of metal ion also apply when other passivation adjuvants are used, i.e. to the moiety thereof that provides the reduced telogenic behavior benefit to the hydrocarbon-containing surfactant. The timing of the passivation reaction will depend on the oxidizing agent used and is preferably either prior to the addition of the stabilizing surfactant to the reactor, i.e. the aqueous medium in the reactor, or during this addition to the reactor, or after this addition to the reactor.

A preferred embodiment of the present invention can also be described as the process for polymerizing fluoromonomer to form a dispersion of fluoropolymer particles in an aqueous medium in a polymerization reactor, comprising (i) providing the aqueous medium in the reactor, (ii) adding water soluble hydrocarbon-containing compound to the aqueous medium, the compound containing hydrophilic moiety and hydrophobic moiety, (iii) adding water soluble free-radical initiator to the aqueous medium, (iv) pressuring up the reactor with the fluoromonomer to the pressure desired for carrying out the polymerizing, (v) kicking off the polymerization by adding water-soluble free-radical polymerization initiator to the aqueous medium in an effective amount that causes the kicking off, the amount of the free-radical initiator added to the aqueous medium in step (iii) being insufficient to cause the kicking off, (vi) continuing the polymerizing of the fluoromonomer, and (vii) adding surfactant to the aqueous medium to stabilize the resulting dispersion of fluoropolymer particles, the carrying out of steps (ii) and (iii) resulting in the size of the particles being smaller than the size obtained if steps (ii) and (iii) were omitted.

In this preferred embodiment:

The hydrocarbon-containing compound under step (ii) can be any of the hydrocarbon-containing compounds, including hydrocarbon-containing surfactants and hydrocarbon surfactants and the preferences with respect to these compounds and surfactants mentioned above.

The free radical initiator under step (iii) can be can be any initiator that degrades the compound mentioned under step (ii), whereby the hydrophobic moiety becomes the oleophilic nucleation sites for the polymerization under steps (v) and (vi). Typically, the initiator will be a polymerization initiator even though its degradation function is not a polymerization function. Any of the initiators mentioned above for creating the oleophilic nucleation sites can be used.

A water-soluble inorganic salt as mentioned above is preferably added to the aqueous medium prior to step (iii). Any of such salts as mentioned above can be used to obtain the beneficial effect described above.

The amounts of compound/surfactant under step (ii), free-radical initiator under step (iii) and the salt mentioned in the preceding paragraph can be any of the amounts and combinations mentioned above.

The stabilizing surfactant added under step (vii) can be any of those mentioned above. Preferably such surfactant is hydrocarbon containing, and more preferably hydrocarbon and the carrying out of step (vii) is delayed until after the kicking off under step (v) and the addition is by metering the surfactant into the aqueous medium. The delay and metering aspects can be any of those mentioned above.

The stabilizing surfactant is preferably passivated as described above.

The compound/surfactant under step (ii) can be nonionic, anionic or cationic, but nonionic surfactant, is preferred. The preferred stabilizing surfactant under step (vii) is anionic. The preferred combination is nonionic surfactant under step (ii) and anionic surfactant under step (vii), both surfactants preferably being hydrocarbon surfactants The fluoropolymer of the particles in the dispersion formed by the polymerization can be any of those mentioned above, including the preferred fluoroplastics and perfluoroplastics.

The polymerization can be carried out to obtain any of the results insofar as solids content and coagulum levels mentioned above.

EXAMPLES

The following hydrocarbon surfactants are used in the Examples. When used to form oleophilic nucleation sites, these surfactants are referred to in the Examples as nucleants.

Pluronic® 31R1 is a double-ended nonionic surfactant identified earlier herein as a Pluronic® R surfactant. It has an average molecular weight of 3250. Both ends of the surfactant (compound) are hydrophobic and the center is hydrophilic.

Avanel® S-70 is anionic containing ethylene oxide groups identified earlier herein Silwet® L7600 is a nonionic pendant-type polyethyleneoxide-modified polydimethylesiloxane available from GE Silicones.

Tergitol® 100 is a 70/30 wt % blend of TMN 6/TMN 10 identified earlier herein as members of the Tergitol® TMN series of surfactants. The Tergitol® TMN series surfactants are branched nonionic surfactants.

CTMAB is cetyltrimethylammonium bromide ($CH_3(CH_2)_{15}N(CH_3)_3Br$) a cationic surfactant.

SDS is sodium dodecyl sulfate, a linear anionic hydrocarbon surfactant with no ethylene oxide groups.

SOS is sodium octyl sulfonate

Triton® X-100 is a nonionic surfactant, which is octyl phenol polyethoxy alcohol as identified above.

The wax used in the Examples is a paraffin wax

Particle size of the raw dispersion of fluoropolymer particles is measured using laser light scattering with a Zetasizer Nano-ZS manufactured by Malvern Instruments. Samples for analysis are prepared in 10×10×45 mm polystyrene cuvettes, capped and placed in the device for analysis. Preparation of the sample is as follows. Water used to flush the cuvette and used to dilute the dispersion sample is rendered substantially free of particles by drawing deionized, deaerated water into a 10 cc glass hypodermic syringe with locking tip. A Whatman 0.02 micron filter (Cat. No. 6809-2002) is fitted to the locking tip of the syringe and pressure is applied force water through the filter and into the cuvette. Approximately 1.5 ml of water is placed in the cuvette, the cuvette is capped, shaken and uncapped. Water is poured out of the cuvette thus assuring the cuvette is free of particles. Approximately 2.5 gm of filtered water is placed in the cuvette. One drop of the fluoropolymer dispersion to be analyzed is added to the cuvette. The cuvette is capped and shaken to completely mix the fluoropolymer particles in the water. The sample is placed in the Nano-ZS for determination of Dv(50). Dv(50) is the median particle size based on volumetric particle size distribution, i.e. the particle size below which 50% of the volume of the population resides.

Melt flow rate (MFR) is determined using the procedure of ASTM D 1228 and melt temperature and plastometer piston weight conditions that are standard for the polymer as indicated in the ASTM procedure for the particular polymer.

Melting temperature is measured by Differential Scanning calorimeter (DSC) according to the procedure of ASTM D 4591. The PTFE DSC melting temperature is obtained from the first time the polymer is heated above the melting temperature, also referred to as the first heat, in accordance with ASTM D-4591-87. The melting temperature reported is the peak temperature of the endotherm on first melting.

The definition (calculation) of ppm herein is the weight of the ingredient divided by the weight of water present in the reactor at the time of the event when the concentration in ppm is being determined. Ppm of water soluble hydrocarbon-containing compound/nucleant surfactant (compound/nucleant surfactant), salt, if any, and degradation agent/initiator in the precharge composition to the polymerization reactor is based on the weight of water initially charged to the reactor and any additional water charged containing each of the compound/nucleant surfactant, salt, if present, and degradation agent/initiator ingredients. Thus, the amount of water present in the reactor at the time of forming the oleophilic nucleation sites is the weight of water on which the ppm of the compound/nucleant surfactant, salt, if any, and degradation agent/initiator is determined. This amount will not include water added as solvent for the polymerization initiator added to the aqueous medium to provide for kickoff of the polymerization reaction or for addition of stabilizing surfactant to the aqueous medium. This amount of added water would be included in the ppm calculation of any surfactant present in the aqueous medium at the time of polymerization kickoff. For simplicity, when the water added to the reactor contains a dissolved ingredient, such as compound/nucleant surfactant, salt, degradation agent/initiator, the resultant solution is considered to be entirely of water for purposes of ppm calculation.

The disclosure of numerical amounts as "no greater than" and the like herein has the same meaning as the same numerical amounts being designated as being particular amounts or less. Thus, no greater than 50 ppm has the same meaning as 50 ppm or less. Similarly, the disclosure of numerical amounts of "at least" and the like herein has the same meaning as the same numerical amounts being designated as being particular amounts or greater. Thus, at least 20 wt % has the same meaning as 20 wt % or greater.

The term nucleant used herein refers to the surfactant from which the oleophilic nucleation sites are obtained by oxidation of the surfactant in an aqueous medium.

The reactor pressures disclosed herein are absolute pressures unless otherwise indicated as being gauge pressures (psig). The MPa and KPa pressures disclosed as corresponding to the psig gauge pressures are absolute pressures.

Example 1

This Example contains experiments of polymerization with and without the formation of the dispersion of oleophilic nucleation sites, with and without the presence of salt, and the use of various water soluble hydrocarbon-containing compounds (nucleants) and salts.

General procedure for polymerization with no nucleation site formation step prior to polymerization kickoff: To a 12 liter, horizontally disposed, jacketed, stainless steel autoclave with a two blade agitator is added 5700 gm of deionized, deaerated water and 250 gm of liquid wax. The autoclave is sealed and placed under vacuum. The autoclave pressure is raised to 30 psig (310 kPa) with nitrogen and brought to vacuum 3 times. Autoclave agitator is set at 65 RPM. The autoclave is heated to 90° C. and TFE is charged to the autoclave to bring the autoclave pressure to 400 psig (2.86 MPa). At time zero, 150 ml of initiator solution of deionized, deaerated water containing 0.05 gm of ammonium persulfate (APS) and 3.5 gm of disuccinic acid peroxide (DSP) is injected at 80 ml/min. Kickoff time ("KO Time" in Table A) is measured as the time (since time zero) necessary to drop 10 psi (69 kPa) from the maximum pressure observed during injection of the charge initiator solution. At kickoff, autoclave pressure is brought back to 400 psig (2.86 MPa) with TFE and maintained at that pressure for the duration of the polymerization. After 100 gm of TFE is fed since kickoff, a stabilizer surfactant solution is pumped to the autoclave at the rate of 4 ml/min (0.28 g/l-hr). This delay in commencing the surfactant addition to the aqueous medium corresponds to a PTFE concentration in the aqueous medium of 1.68 wt % before this addition begins (calculation: 100 gm TFE÷[100+5700+150]×100). Preparation of the stabilizer solution is given below. After 750 gm of TFE has been added to the autoclave since kickoff, the Batch Time (Table A) is recorded, the agitator is stopped, the autoclave is vented to atmospheric pressure and the dispersion is discharged. Upon cooling, wax is separated from the dispersion. The PTFE dispersion has a pH of 2.8, % solids of 11.75 and Dv(50) of 198 nanometers (Experiment A-1 in Table A). The PTFE has a high molecular weight (Mn) of at least 1,000,000, as indicated by DSC melting temperature of 332° C. ($1^{st}$ heating) and DSC heats of fusion of 76 J/g ($1^{st}$ heating) vs 47.5 J/g ($2^{nd}$ heating), reflecting the extremely high melt viscosity of the PTFE reducing the amount of recrystallization occurring during cooling from the first heating. The PTFE also exhibits no flow in the ASTM D1238 test, i.e. an MFR of 0.

The surfactant in the surfactant stabilizing solution used in the above procedure is passivated by the following procedure: In a 1 liter, jacketed round bottom flask is added 681.74 gm of deionized, deaerated water, 10.5 gm of sodium dodecyl sulfate (ACS Reagent, >99.0%) and 0.315 gm of Iron(II) sulfate heptahydrate. The contents are agitated until all solids are dissolved. The solution pH is adjusted to 2.0-2.5 with 12 to 14 drops of concentrated sulfuric acid. 37.34 gm of 30 wt % hydrogen peroxide aqueous solution is slowly added to the agitating mixture. Agitation continues for 1 hr at room temperature (22-23° C.) after which time the resultant oxidized surfactant in aqueous solution is used in the above polymerization procedure.

The above polymerization procedure has no nucleation step prior to polymerization kickoff, and the polymerization result is reported as A-1 in Table A.

The nucleation step is practiced by repeating the above polymerization procedure except that 5200 gm of deionized, deaerated water and 250 gm of liquid wax is the initial charge to the autoclave. Then, 500 gm of deionized, deaerated water containing 0.085 gm of surfactant (Nucleant, Table A) and 0.4 gm of sodium sulfite water-soluble inorganic salt is added to the autoclave. After heating the autoclave to polymerization temperature but before charging TFE to bring the autoclave to operating pressure, 50 ml of an aqueous solution containing 0.5 gm of APS per liter of deionized, deaerated water is added. In the resultant aqueous medium, the surfactant concentration is 14.8 ppm (calculation: (calculation: (0.085÷5750)×100), the salt concentration is 70 ppm, and the initiator concentration is 4.3 ppm, providing an initiator concentration of 4 ppm. Under the conditions/additives present in the aqueous medium (precharge composition), the APS causes an oxidation reaction of the hydrocarbon surfactant to occur, resulting in the formation of oleophilic nucleation sites dispersed in the aqueous medium. The presence of these sites is indicated by the smaller particle size (Dv(50)) of the PTFE particles reported in Table A for Experiments A-3 through A-9, using nonionic, anionic, and cationic surfactants. The long time to polymerization kickoff for Experiment A-9 is attributed to the aromatic moiety present in this surfactant, the other surfactants used being non-aromatic, i.e. free of aromatic moiety. It is contemplated that this kickoff time can be reduced by reducing the amount of this surfactant used. The delay in this repeat experiment reported as Experiments A-3 to A-9 in Table A is 1.67 wt % fluoropolymer concentration before the stabilizing surfactant addition begins (calculation: 100 g TFE÷[100+5200+500+50+150]×100). The actual time of delay for all the experiments reported in Table A range from 4.4 to 6 min. after kickoff before the stabilizing surfactant addition begins.

Experiment A-2 is the result of the polymerization procedure described above in which no nucleation surfactant is present, except that the sodium sulfite salt is added in the amount show in Table A. The presence of the salt and no nucleation surfactant results in a much larger PTFE particle size suggesting that the salt is causing fewer polymer particles to be formed during the initial stage of polymerization.

The above polymerizations are conducted as a screening series of polymerizations, i.e. carried out to dispersion PTFE solids (particles) content of about 11-13 wt %, based on total weight of the polymerization medium, resulting from the feed of just 750 gm of TFE after kickoff to the autoclave for the polymerization reaction The screening result available from the above polymerizations can be extrapolated to the polymerization result if the polymerization were extended to consume 3200 g of TFE to produce a dispersion solids content of about 34 wt %. This extrapolated result is reported in Table A as the Dv(50) in parenthesis This extrapolation can be done by using the following equation:

$$D2 = [P2 \times (D1)^3 / P1]^{1/3}$$

wherein P1 is the actual amount of polymer produced (in grams) having the Dv(50) particle size D1 (in nanometers); P2 equals the projected polymer produced in grams, and D2 is the projected particle size (in nanometers) of the P2 polymer. Sample calculation for experiment A3

$$D2 = (3200 \times 113^3 / 849)^{1/3} = (5438481.04)^{1/3} = 176$$

Experiment A-1 is a comparative experiment, in which neither nucleant surfactant nor salt is used, i.e. the nucleation step procedure describe above is not used. Experiment A-2 is also a comparative experiment in which salt, but not nucleant surfactant is used. Comparison of the Dv(50) results of Experiment A-1 with Experiments A-3 to A-10 reveals the effect of the oleophilic nucleation sites present in Experiments A-3 to A-10 on providing a smaller fluoropolymer particle size. Experiment A-2 reveals that using the salt alone provides a poorer result as a much larger Dv(50) particle size, much larger than for Experiment A-1.

The above polymerization procedure is repeated in a series of experiments in which the nucleation step is included in the polymerization procedure with different salt (experiments B-1 to B-3), except that no salt is present in the nucleation site forming step in Experiment B-4. The nucleant surfactant is 14.8 ppm Pluronic® 31R1. The amount of salt is 70 ppm and the amount of APS initiator is 4 ppm. The delay in commencing the stabilizing surfactant addition is 1.67 wt % PTFE concentration in the aqueous medium. The results are reported in Table B.

TABLE A

| Exp. # | Nucleant Name | $Na_2SO_3$ ppm | KO Time Min | Batch Time "B" Min | Solids % | Dv(50)* nm | Particles Number | Polymer Made gm |
|---|---|---|---|---|---|---|---|---|
| A-1 | | | 4.3 | 37.9 | 11.75 | 198 (311) | 9.44E+16 | 829 |
| A-2 | | 70 | 2.4 | 45.4 | 12.06 | 358 (556) | 1.64E+16 | 853 |
| A-3 | Pluronic® 31R1 | 70 | 3.4 | 36 | 11.97 | 113 (176) | 5.20E+17 | 849 |
| A-4 | Avanel® S70 | 70 | 4.4 | 34.1 | 12.04 | 119 (184) | 4.51E+17 | 859 |
| A-5 | Silwet® L7600 | 70 | 2.8 | 30.1 | 11.97 | 130 (202) | 3.43E+17 | 852 |
| A-6 | Avanel® S74 | 70 | 3.4 | 33.2 | 12.18 | 134 (207) | 3.21E+17 | 874 |
| A-7 | Tergitol® 100 | 70 | 4.8 | 33.1 | 11.85 | 136 (213) | 2.94E+17 | 837 |
| A-8 | CTMAB | 70 | 3 | 36.8 | 11.84 | 160 (251) | 1.80E+17 | 833 |
| A-9 | Triton® X-100 | 70 | 20.9 | 44.4 | 11.82 | 154 (241) | 2.03E+17 | 838 |

*The Dv(50) values in parentheses are extrapolated from the measured Dv(50) value (no parentheses) using the equation presented below.

TABLE B

| Exp. # | Inorganic Salt Name | Batch Time min | Dispersion solids % | Dv(50) nm | Particles Number | Polymer Made gm |
|---|---|---|---|---|---|---|
| B-1 | $Na_2SO_3$ | 33.1 | 11.81 | 118 | 4.404E+17 | 818 |
| B-2 | $NaHSO_3$ | 38.3 | 11.72 | 95.1 | 8.487E+17 | 826 |
| B-3 | $Na_2S_2O_5$ | 40.3 | 11.92 | 107 | 6.016E+17 | 833 |
| B-4 | — | 36.0 | 11.68 | 125 | 3.81E+17 | 842 |

As shown in Table B, different salts all provide small PTFE particle sizes. Experiment A-4 shows the Dv(50) result when nucleant surfactant, but no salt is used.

The PTFE made in all these polymerizations exhibits the characteristics described earlier in this Example.

Example 2

This Example contains experiments using a wide variety of salts in the formation of the dispersion of oleophilic nucleation sites.

To a 12 liter, horizontally disposed, jacketed, stainless steel autoclave with a two blade agitator is added 5300 gm of deionized, deaerated water and 250 gm of liquid wax. To the autoclave is added an additional 500 gm of deionized, deaerated water which contains 0.075 gm of Pluronic® 31R1 and salt in different amounts as shown in Table C. The autoclave is sealed and placed under vacuum. The autoclave pressure is raised to 30 psig (310 kPa) with nitrogen and vented to atmospheric pressure. The autoclave is pressured with nitrogen and vented 2 more times. Reactor agitator is set at 65 RPM. 50 ml of initiator solution containing 1.0 gm of ammonium persulfate (APS) per liter of deionized, deaerated water is added to the reactor to provide an APS concentration of 8.5 ppm. The surfactant concentration is 12.8 ppm. This is the precharge composition within which the dispersion of oleophilic nucleation sites is formed.

The reactor is heated to 80° C. and TFE is charged to the reactor to bring the reactor pressure to 330 psig (2.45 MPa). Then, 75 ml of initiator solution is charged to the reactor at 80 ml/min and then the pump rate is reduced to 1.0 ml/min for the duration of the polymerization. At kickoff (pressure drop of 10 psi (69 kPa)), autoclave pressure is brought back to 330 psig (2.45 MPa) with TFE and maintained at that pressure for the duration of the polymerization. At kickoff, an aqueous solution in deionized, deaerated water containing 2.0 gm of HFPO dimer acid and 1.0 gm of succinic acid per 100 gm of fluid is added to the reactor at 10 ml/min until 250 ml of solution has been added. After 1800 gm of TFE has been added to the reactor, the agitator is stopped, the reactor is vented to atmospheric pressure, and the dispersion is discharged. Upon cooling, wax is separated from the dispersion and the dispersion is filtered. The reactor is cleaned and all polymer removed from the reactor during cleaning is combined with the filtered solids and dried in a vacuum oven to obtain a measure of coagulum (undispersed polymer). PTFE dispersion made in this manner has a nominal pH of 2.7 and is analyzed for particle size and % solids. A polymer sample is obtained by diluting a quantity of dispersion to approximately 10 wt % solids, adding an aqueous solution of ammonium carbonate and vigorously agitating to separate the polymer from the aqueous phase. Polymer is dried in a vacuum oven at 110° C. for approximately 12 hours before being further analyzed. The polymerization results are reported in Table C. The PTFE made in this Example exhibits the characteristics as described for the PTFE in Example 1. The PTFE also has a molecular weight (Mn) greater than $10^6$ and a melt creep viscosity of greater than $10^6$ Pa·s

TABLE C

| Exp # | Inorganic Salt Chemical | ppm | Dispersion Solids % | Dv(50) nm | % Coagulum |
|---|---|---|---|---|---|
| C-1 | Na2SO3 | 34.2 | 22.9 | 102 | 0.2% |
| C-2 | NaHSO3 | 56.4 | 22.9 | 91.9 | 0.3% |
| C-3 | NaHSO3 | 28.2 | 21.93 | 91.6 | 0.4% |
| C-4 | Na2SO3 | 17.1 | 21.14 | 102 | 0.4% |
| C-5 | NaCl | 31.6 | 20.35 | 126 | 0.4% |
| C-6 | NaHSO3 | 34.5 | 21.8 | 87.5 | 0.4% |
| C-7 | K2SO3 | 34.5 | 23.1 | 119 | 0.5% |
| C-8 | K2SO3 | 42.9 | 20.3 | 104 | 0.6% |
| C-9 | Na2CO3 | 34.2 | 23 | 136 | 0.6% |
| C-10 | Na2S2O5 | 34.4 | 21.71 | 93.6 | 0.7% |
| C-11 | NH4 Oxalate•1H2O | 39.1 | 21.2 | 139 | 1.0% |
| C-12 | NaCl | 17.1 | 20.88 | 124 | 1.0% |
| C-13 | K2SO3 | 42.9 | 20.43 | 136 | 1.1% |
| C-14 | Na2B4O7•10H2O | 64.8 | 22.95 | 138 | 1.1% |
| C-15 | CH3COONa•3H2O | 42.1 | 12.3 | 127 | 1.4% |
| C-16 | (NH4)2CO3 | 34.2 | 20.88 | 159 | 1.6% |
| C-17 | Na2HPO4•7H2O | 70.4 | 15.1 | 154 | 2.0% |
| C-18 | NH4H2PO4 | 34.4 | 22.36 | 156 | 2.2% |
| C-19 | (NH4)2HPO4 | 34.7 | 21.72 | 148 | 2.3% |
| C-20 | $Na_2SO_3$ | 140 | 12.89 | 243 | 60.8% |

Experiment C-20 is a comparative experiment. The salt content at 140 ppm is too high, resulting in poor large particle size Dv(50) for the solids content of the polymerization and high coagulum.

Example 3

This Example provides the preparation of modified PTFE.

To a 12 liter, horizontally disposed, jacketed, stainless steel autoclave with a two blade agitator is added 5200 gm of deionized, deaerated water and 250 gm of liquid wax. To the autoclave is added an additional 500 gm of deionized, deaerated water which contains 0.02 gm of Pluronic® 31R1 and 0.4 gm of sodium sulfite. The autoclave is sealed and placed under vacuum. The autoclave pressure is raised to 30 psig (310 kPa) with nitrogen and vented to atmospheric pressure. The autoclave is pressured with nitrogen and vented 2 more times. The agitator speed is set to 65 RPM and the reactor is heated to 90° C. 40 ml of initiator solution containing 0.5 gm of ammonium persulfate (APS) per liter of water is added to the reactor. This is the precharge composition. The concentrations of Pluronic surfactant, salt and initiator in the aqueous medium are 3.5 ppm, 69.6 ppm, and 3.5 ppm, respectively.

The reactor is pressured up by charging the reactor with 12.0 gm of hexafluoropropylene (HFP) and 650 gm of TFE to bring the reactor pressure to 400 psig (2.86 MPa). At time zero, 150 ml of an initiator solution composed of 11.67 gm of disuccinic acid peroxide solution (70 wt % DSP), 0.17 gm of ammonium persulfate and 488.3 gm of deionized, deaerated water is charged to the reactor at 80 ml/min. After 2.0 minutes from the start of initiator injection the reactor pressure drops 10 psi (69 kPa) from the maximum pressure observed during injection of the initiator solution. Autoclave pressure is brought back to 400 psig (2.86 MPa) with TFE and maintained at that pressure for the duration of the polymerization. After 100 gm of TFE has been fed since kickoff, stabilizing surfactant solution, prepared as described below, is pumped to the reactor at a rate of 4 ml/min (0.28 g/l-hr) until the end of the run. This delay in commencing the surfactant addition to the aqueous medium corresponds to 1.67 wt % concentration of modified PTFE in the aqueous medium. After 155.6 minutes since kickoff, 3100 gm of TFE and 688 ml of stabilizing surfactant solution has been added to the reactor. The agitator is stopped, the reactor is vented to atmospheric pressure and the dispersion is discharged. Upon cooling, liquid wax is separated from the dispersion and the dispersion is filtered to remove undispersed solids (coagulum). The reactor is opened and all coagulum is removed from the reactor. Reactor cleanout is combined with the filtered solids and dried in a vacuum oven. To get a measure of coagulum (total undispersed solids), liquid wax adhering to this polymer is further removed by centrifuging and blotting the polymer. Total coagulum is thus determined to be 120.4 gm. Total recovered liquid wax is 208.7 gm. The dispersed fluoropolymer particles constitute 32.8 wt % of the aqueous medium containing this dispersion. The dispersed particles have an average particle size by volume, Dv(50), of 255 nm. These particles are coagulated by diluting the dispersion to about 10 wt % solids and adding aqueous ammonium carbonate solution followed by vigorous agitation until the polymer particles fully separate from the water. The polymer is dried in a vacuum oven at 110° C. for 12 hours. Melting point of this polymer as measured by DSC on first heat is 335° C. Compositional analysis by FTIR gives 0.5 wt % HFP. This modified PTFE has a molecular weight (Mn) of greater than $10^6$, an MFR of 0, and melt creep viscosity greater than $10^6$ Pa·s.

The stabilizing surfactant solution is prepared as follows: In a 1 liter, jacketed round bottom flask is added 492.5 gm of deionized, deaerated water, 7.5 gm of sodium dodecyl sulfate (ACS Reagent, >99.0%) and 0.225 gm of Fe ($^{+2}$) sulfate heptahydrate. The contents are agitated until all solids are dissolved. The solution pH is adjusted to 3.22 with two drops of concentrated Sulfuric Acid. 18.75 gm of 30 wt % hydrogen peroxide is added to the mixture. The mixture is heated to 40° C. while stirring and held at temperature for 2 hours. The solution is discharged and cooled in an ice bath to rapidly bring the fluid to ambient temperature. The final mixture has a pH of 2.76.

Example 4

This Example provides the preparation of PFA.

To a 12 liter, horizontally disposed, jacketed, stainless steel autoclave with a two blade agitator is added 7500 gm of deionized, deaerated water. To the autoclave is added an additional 500 gm of deionized, deaerated water which contains 0.025 gm of Pluronic® 31R1 and 0.2 gm of sodium sulfite. The autoclave is sealed and placed under vacuum. The autoclave pressure is raised to 30 psig (310 kPa) with nitrogen and evacuated three times. Agitation is begun and the agitator speed is set to 70 RPM. 100 ml of PPVE and 0.1 gm of ethane is added to the reactor. The concentrations of surfactant, salt and initiator in the aqueous medium are 3.1 ppm, 25 ppm, and 11.6, respectively. 15 ml of initiator solution containing 6.2 gm ammonium persulfate per liter of deionized, deaerated water is added to the reactor, i.e. the amount of APS in the precharge composition is 11.2 ppm. The reactor is heated to 85° C. and then TFE (approximately 290 gm) is charged to the reactor to bring the reactor pressure to 300 psig (2.17 MPa). At time zero, 100 ml of initiator solution is charged to the reactor at 80 ml/min and then the initiator is pumped continuously at 0.6 ml/min until the end of the run. Kickoff occurs after 1.5 minutes from the start of initiator injection when the reactor pressure drops 10 psi (69 kPa) from the maximum pressure observed during injection of the initiator solution. At kickoff, the reactor temperature controller setpoint is reduced from 85° C. to 75° C. Autoclave pressure is controlled at 300 psig (2.17 MPa) with addition of TFE and 0.03 ml PPVE per gram of TFE fed for the duration of the polymerization. After 1000 gm of TFE has been fed since kickoff, a surfactant solution in deionized, deaerated water containing 0.5 gm of sodium dodecyl sulfate (SDS) per 100 g of deionized, deaerated water as the stabilizing surfactant is pumped into the reactor at a rate of 1 ml/min until the end of the run. This delay in commencing the addition of stabilizing surfactant to the aqueous medium corresponds to 11.6 wt % concentration of PFA in the aqueous medium, calculated below. The time delay is 50 min. The metering rate of the stabilizing surfactant is 0.025 g/l-hr. After 135 minutes since kickoff, 2300 gm of TFE and 86 ml of surfactant solution have been added to the reactor. The agitator is stopped, the reactor is vented to atmospheric pressure and the dispersion is discharged. 10.68 kg of aqueous dispersion is produced with 22.1 wt % solids content in the aqueous medium and 114 nm raw dispersion particle size. Coagulum obtained from filtering the dispersion through cheesecloth and from cleaning the reactor is dried in a vacuum oven and measures 63 gm (0.6 wt %). PFA Polymer is isolated by freezing a dispersion sample followed by thawing, filtration, washing and drying. The polymer contains 6.0 wt % PPVE as measured by FTIR and has a MFR of 10.8 gm/10 min.

Calculation of wt % (fluoropolymer) concentration in aqueous medium:

A=total weight of polymer produced
B=total weight of water in reactor
A=wt TFE fed/(1−weight fraction of PPVE in fluoropolymer)
A=1000/(1−0.06)=1063.8
B=total weight of water added to reactor
B=7500+500+15+100+(0.6×50)=8145

$$\text{Wt \% concentration} = [A/(A+B)] \times 100$$
$$= [1063.8/(1063.8+8145)] \times 100 = 11.6$$

This experiment is repeated except for the following: Rather than adding 15 ml of initiator solution before heating the reactor to 85° C., the initiator solution is added after heating the reactor and before TFE is charged in order to bring the reactor to 300 psig (2.17 MPa). Kickoff time is 2.6 minutes, batch time is 138 minutes and 89 ml of surfactant solution is added to the reactor. 10.52 kg of aqueous dispersion is produced with 22.0 wt % solids content and 128 nm raw dispersion particle size. Coagulum obtained from filtering the dispersion through cheesecloth and from cleaning the reactor is dried in a vacuum oven and measures 95 gm. The isolated polymer contains 5.4 wt % PPVE as measured by FTIR and has a MFR of 12.0 gm/10 min. The delay in commencing the addition of the stabilizing surfactant to the aqueous medium is 49.5 min after kickoff and corresponds to a PFA concentration of 11.5 wt %.

Example 5

The Example provides the preparation of FEP.

To a 12 liter, horizontally disposed, jacketed, stainless steel autoclave with a two blade agitator is added 6000 gm of deionized, deaerated water. To the autoclave is added an additional 500 gm of deionized, deaerated water which contains 0.015 gm of Pluronic® 31R1 and 0.1 gm of sodium sulfite. The autoclave is sealed and placed under vacuum. The autoclave pressure is raised to 30 psig (310 kPa) with nitrogen and evacuated three times. Agitation is begun and the agitator speed is set to 75 RPM. The reactor is heated to 95° C. 2.6 ml of initiator solution containing 22 gm ammonium persulfate per liter of deionized, deaerated water is added to the reactor. The concentrations of surfactant, salt and initiator in the aqueous medium are 2.3 ppm, 15.4 ppm and 8.8 ppm, respectively.

HFP and TFE are charged to the reactor in a weight ratio of 1.857/1 HFP/TFE in order to bring the reactor pressure to 435 psig (3.10 MPa). At time zero, 30 ml of the above initiator solution is charged to the reactor at 80 ml/min and then the initiator is continuously pumped at 1.5 ml/min until the end of the run. Kickoff occurs after 3.5 minutes from the start of initiator injection when the reactor pressure drops to 425 psig (3.03 MPa). For the duration of the run, autoclave pressure is controlled at 425 psig (3.03 MPa) with addition of TFE. After 300 gm of TFE has been fed since kickoff, a surfactant solution containing 1.45 gm of passivated sodium dodecyl sulfate per 100 gm of solution is pumped to the reactor at a rate of 0.75 ml/min until the end of the run. The delay in commencing the addition of stabilizing surfactant to the aqueous medium is 37.5 min and corresponds to an FEP concentration in the aqueous medium of 4.9 wt %. The metering rate of the surfactant into the aqueous medium is 0.054 g/l-hr. The passivation treatment of the stabilizing surfactant (SDS) is the same as set forth in Example 3. After 248 minutes since kickoff, 2000 gm of TFE and 158 ml of surfactant solution have been added to the reactor. The agitator is stopped, the reactor is vented to atmospheric pressure and the dispersion is discharged. 8.70 kg of aqueous dispersion is produced with 23.2 wt % solids content and 165 nm raw dispersion particle size. Coagulum obtained from filtering the dispersion through cheesecloth and from cleaning the reactor is dried in a vacuum oven and measures 270 gm. Polymer is isolated by freezing a dispersion sample followed by thawing, filtration, washing and drying. The polymer contains 10.6 wt % HFP as measured by FTIR and has a melting point of 273° C.

Example 6

This Example compares polymerization results for preparing PTFE having the characteristics of the PTFE of Example 1 by using different delays after polymerization kickoff, for introducing the stabilizing surfactant into the aqueous polymerization medium.

A summary of the polymerization conditions is as follows: 5700 gm of deionized, deaerated water is charged to the reactor with 0.085 gm of Pluronic® 31R1, 0.02 gm of Triton X-100 and 0.4 gm of $Na_2SO_3$ and heated to 90° C. Then, 80 ml (0.04 gm APS), providing an APS concentration of 6.9 ppm, is added to the aqueous medium. The concentrations of surfactants in the aqueous medium are 14.7 ppm and 3.4 ppm, respectively, and the concentration of salt is 69 ppm and of the initiator is 6.9 ppm. The reactor is pressured up to 400 psig (2.86 MPa) with the addition of 660 gm of TFE. For initiating the polymerization, 150 ml of an initiator solution containing 0.33 gm APS and 22.33 g (70% active DSP) per liter of deionized, deaerated water is added to the reactor. After kickoff (KO) the pressure is maintained at 2.86 MPa with the addition of TFE. At 22 gm TFE feed (Experiments D-3 and D-4) or 300 gm TFE feed (Experiments D-1 and D-2, the introduction of the SDS or SOS stabilizing surfactants into the aqueous polymerization medium is begun. The delay of 22 gm of TFE being consumed before surfactant addition is commenced corresponds to a PTFE concentration in the aqueous medium of 0.37 wt %. The delay of 300 gm of TFE being consumed before surfactant addition is commenced corresponds to a PTFE concentration in the aqueous medium of 5.06 wt %. Stabilizer surfactant solution is pumped into the aqueous medium at a rate of 2 ml/min until 1000 gm of TFE feed. This pumping rate is a metering rate of 0.14 g/l-hr. Then, the pump rate is raised to 3 ml/min (0.22 g/l-hr). The concentration of SDS or SOS in the pump solution is 1.445 gm per 100 gm of fluid.

TABLE D

| Exp. | Stabilizer | | Start Stabilizer | Stop Stabilizer | Batch Time | Dv(50) | % solids |
| | ppm | Type | gm TFE Fed | | min | nm | % |
| --- | --- | --- | --- | --- | --- | --- | --- |
| D-1 | 898 | SDS | 300 | 2200 | 166 | 235 | 26 |
| D-2 | 1327 | SOS | 300 | 1760 | 464 | 196 | 2 |
| D-3 | 1327 | SDS | 22 | 968 | 464 | 146 | 18 |
| D-4 | 1327 | SOS | 22 | 1348 | 464 | 174 | 23 |

The results shown in this Table is that the delay of 22 gm (0.37 wt %) is too short for both SDS and SOS, as indicated by the long polymerization time of 464 min. This delay of 22 gm of TFE consumed before surfactant addition is commenced is the similar to the 0.36 wt % delay practiced in Example 1 of U.S. Pat. No. 7,521,513 making $VF_2$/HFP copolymer (calculation: [90÷(25000+100+90)×100]. Upon reaching the batch time of 464 min, the polymerization reaction is stopped, without the TFE monomer feed ever reaching the 2200 gm PTFE goal. Experiment D-1 provides the best result, enabling the 2200 gm PTFE goal to be met in a much shorter batch time than Experiments D-2 through D-4.

The above polymerizations are repeated with the following changes: the initiator pump rate is faster (4.0 ml/min.), and the delay in stabilizer surfactant feed is until 100 gm of TFE makeup feed to the reactor after kickoff. This delay corresponds to a PTFE concentration in the aqueous medium of 1.66 wt %. These changes in the repetition of the polymerizations are undertaken in recognition of the benefit (reduced telogenicity) of the stabilizing surfactant being passivated as described below. Pumping continues to the end of the run. The results are shown in Table E. MFR is measured on the PTFEs of this Example, the result being no melt flow.

The SDS and SOS stabilizing surfactants are passivated prior to introduction into the aqueous polymerization medium according to the following procedure:

Into a 1 L glass bottle, 10.5 gm of sodium dodecyl sulfate is added to 681.74 gm of deaerated water and further stirred using stir bar until all solids are dissolved and the solution is clear. 0.315 gm of iron ($^{+2}$) sulfate heptahydrate is added to this solution at room temperature. The pH is then adjusted to 2.0-2.5 with 12-14 drops of conc. $H_2SO_4$. The contents of this bottle are transferred to a 3-necked 1 L glass reactor that has a heating/cooling jacket equipped with thermometer and an overhead stirrer. 37.34 gm of $H_2O_2$ (30% solution) are then added slowly to this stirred solution. The solution is then further stirred at room temperature for 60 additional minutes after completion of the $H_2O_2$ addition. The solution containing the resultant passivated SDS reaction is then discharged into 1 L glass bottle, and this is the solution used for pumping stabilizing surfactant into the polymerization reaction. The same passivation procedure is used for SOS, except that it is added to the IL glass bottle as a solution in water, available as Witconate® NAS-8 surfactant, to provide the same 10.5 gm of SOS.

TABLE E

| Example | Stabilizer ppm | Stabilizer Type | Start Stabilizer gm TFE Feed | TFE Makeup gm | Batch Time min | Dv(50) nm | % solids % |
|---|---|---|---|---|---|---|---|
| E-1 | 922 | SDS | 100 | 3100 | 110 | 188 | 34 |
| E-2 | 1127 | SOS | 100 | 3100 | 134 | 194 | 16 |

The passivation of the SDS and SOS stabilizing surfactants results in much shorter batch times to make a greater amount of PTFE Example 7

The Example compares polymerization results from stabilizing surfactant passivated at different temperatures. The passivation procedure is as follows: In a 1 liter, jacketed round bottom flask is added 681.74 gm of deionized deaerated water, 10.5 gm of sodium dodecyl sulfate (ACS Reagent, >99.0%) and 0.315 gm of Fe($^{+2}$) sulfate heptahydrate. The contents are agitated until all solids are dissolved. The solution pH is adjusted to 2.0-2.5 with 12-18 drops of concentrated sulfuric acid. While holding the mixture at the desired passivation temperature (PT) (Experiments F-1, F-2, and F-3 in Table F) by circulating thermally regulated water through the flask jacket, 37.34 gm of 30 wt % hydrogen peroxide is added to the mixture. The mixture is agitated for 1 hour before being discharged and as necessary rapidly cooled to room temperature using an ice bath.

The polymerization procedure is as follows: To a 12 liter, horizontally disposed, jacketed, stainless steel autoclave with a two-blade agitator is added 5200 gm of deionized deaerated water and 250 gm of liquid wax. To the autoclave is added an additional 500 gm of deionized deaerated water which contains 0.085 gm (14.9 ppm) of Pluronic® 31R1, 0.02 gm (3.5 ppm) of Triton® X-100 and 0.4 gm (70 ppm) of sodium sulfite. The autoclave is sealed and placed under vacuum. The autoclave pressure is raised to 30 psig (310 kPa) with nitrogen and brought to vacuum 3 times. The agitator speed is set to 65 RPM and the reactor is heated to 90° C. 0.04 g APS initiator is next charged to the heated aqueous medium (80 ml of 0.5 g/l initiator solution in deionized, deaerated water) to provide an APS concentration in the precharge of 6.9 ppm. The surfactant concentrations are 14.7 ppm and 3.5 ppm, respectively, and the salt concentration is 70 ppm in the aqueous medium. TFE is charged to the reactor to bring the reactor pressure to 400 psig (2.86 MPa). At time zero, 150 ml of an initiator solution composed of 11.67 gm of (70% active) disuccinic acid peroxide, 0.17 gm of ammonium persulfate (APS) and 488.3 gm of deionized, deaerated water is charged to the reactor at 80 ml/min. Approximately 7 minutes from the start of initiator injection the reactor pressure drops 10 psi (69 kPa) from the maximum pressure observed during injection of the initiator solution. Autoclave pressure is brought back to 400 psig (2.86 MPa) with makeup TFE and maintained at that pressure for the duration of the polymerization by continuous addition of makeup TFE. After 100 gm of TFE has been fed since kickoff, surfactant solution is pumped to the reactor at a rate of 4 ml/min until the end of the run. This delay in commencing addition of the stabilizing surfactant to the aqueous medium corresponds to a PTFE concentration in the aqueous medium of 1.66 wt %, and the metering rate of the surfactant into the aqueous medium is 0.29 g/l-hr. The batch time (time from kickoff to the end of makeup TFE addition) is shown in the table below. After 3100 gm of makeup TFE has been added to the reactor, the agitator is stopped, the reactor is vented to atmospheric pressure and the dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven. To get a measure of coagulum (total undispersed solids) liquid wax adhering to this polymer is further removed by centrifuging and blotting the polymer. Coagulum thus obtained in these examples is 35-38 grams. Aqueous dispersion produced is 9.7 kg with 34% solids and an average particle size by volume, Dv(50), as shown in the Table F below. Polymer is coagulated by diluting the dispersion to about 10 wt % solids and adding aqueous ammonium carbonate solution followed by vigorous agitation until the polymer fully separates from the water. The polymer is dried in a vacuum oven at 110° C. for 12 hours. The PTFE exhibits the molecular weight and melt creep viscosity characteristics of the PTFE described in Example 2.

TABLE F

| Experiment | PT Temp. ° C. | Batch Time min. | Dv(50) nm |
|---|---|---|---|
| F-1 | 22 | 110.1 | 188 |
| F-2 | 30 | 109.2 | 176 |
| F-3 | 40 | 152.4 | 197 |

The batch time falls sharply from passivation of the stabilizing surfactant at 40° C. to passivation at lower temperatures Example 8

The Example compares polymerization performance using passivated and unpassivated stabilizing surfactant To a 12 liter, horizontally disposed, jacketed, stainless steel autoclave with a two blade agitator is added 5200 gm of deionize, deaerated water and 250 gm of liquid wax. To the autoclave is added an additional 500 gm of deionized deaerated water which contains 0.075 gm of Pluronic® 31R1 and 0.2 gm of sodium sulfite. The autoclave is sealed and placed under vacuum. The autoclave pressure is raised to 30 psig (310 kPa) with nitrogen and brought to vacuum three times. Reactor agitator is set at 65 RPM. The reactor is heated to 90° C. and 100 ml of initiator containing 0.5 gm APS per liter of deionized, deaerated water is added to the reactor, providing an APS concentration of 8.6 ppm in the precharge composition. The concentration of the surfactant is 12.9 ppm and of the salt is 34.5 ppm in the aqueous medium.

690 gm of TFE is added to the reactor to bring the reactor pressure to 400 psig (2.86 MPa). At time zero, 150 ml of initiator solution containing 0.5 gm APS per liter of deionized, deaerated water is charged to the reactor at 80 ml/min and then the pump rate is reduced to 1.0 ml/min for the duration of the polymerization. Kickoff is measured as the time (since time zero) necessary to drop 10 psi (69 kPa) from the maximum pressure observed during injection of the charge initiator solution. Kickoff occurs in 2 minutes and the autoclave pressure is brought back to 400 psig (2.86 MPa) with makeup TFE and maintained at that pressure for the duration of the polymerization by continuous addition of makeup TFE. After 300 gm of makeup TFE has been added to the reactor, a pump solution containing 8.0 gm of sodium dodecyl sulfate per liter of water is added to the reactor at a rate of 2.0 ml/min until a total of 300 gm of solution has been added. The time delay between kickoff and commencement of the SDS addition is 9.3 min, the concentration of PTFE in the aqueous medium at the end of this time delay is 4.79 wt %, and the surfactant metering rate is 0.08 g/l-hr. After 197 minutes from time zero, 2200 gm of makeup TFE has been added to the reactor, the agitator is stopped, the reactor is vented to atmospheric pressure and the dispersion is discharged. PTFE dispersion thus made has 28% solids and a raw dispersion particle size of 213 nm. A polymer sample is obtained by diluting a quantity of dispersion to approximately 10 wt % solids, adding an aqueous solution of ammonium carbonate and vigorously agitating to separate the polymer from the aqueous phase. Polymer is washed with deionized water and dried in a vacuum oven at 110° C. for approximately 12 hours before being further analyzed. The PTFE exhibits the characteristics of the PTFE as described in Example 2.

The above experiment is repeated except that after 300 gm of makeup TFE is added to the reactor, a pump solution containing 14.4 gm of passivated sodium dodecyl sulfate per liter of water is added to the reactor at a rate of 1.67 ml/min until the end of the run at which time 2200 gm of makeup TFE has been added to the reactor. The delay in commencing the addition of the passivated SDS to the aqueous medium is 9.7 min, the PTFE concentration at the end of the delay is 4.79 wt %, and the metering rate of the surfactant into the aqueous medium is 0.12 g/l-hr. Total quantity of passivated sodium dodecyl sulfate solution added is 115 ml. The batch time of 79 minutes is significantly less than the unpassivated experiment in the preceding paragraph. The dispersion measures 26.5% solids and has a raw dispersion particle size of 175 nm. The PTFE exhibits the characteristics of the PTFE as described in Example 2.

The passivation of the SDS is carried out by the following procedure: Into a 1 liter, jacketed round bottom flask is added 681.74 gm of deionized, deaerated water, 10.5 gm of sodium dodecyl sulfate (ACS Reagent, >99.0%) and 0.315 gm of iron($+2$) sulfate heptahydrate. The contents are agitated until all solids are dissolved. The solution pH is adjusted to 2.0-2.5 with 12-18 drops of concentrated sulfuric acid. While holding the mixture at 22° C. by circulating thermally regulated water through the flask jacket, 37.34 gm of 30 wt % hydrogen peroxide is added to the mixture. The mixture is agitated for 1 hour before being discharged for use as the solution of passivated stabilizing surfactant in polymerization.

Example 9

This Example discloses the polymerization to make PTFE using an ethoxylated anionic surfactant as the stabilizing surfactant.

To a 12 liter, horizontally disposed, jacketed, stainless steel autoclave with a two blade agitator is added 5200 gm of deionized, deaerated water and 250 gm of liquid wax. To the autoclave is added an additional 500 gm of deionized, deaerated water which contains 0.085 gm of Pluronic® 31R1, 0.02 gm of Triton® X-100 and 0.4 gm of $Na_2SO_3$. The autoclave is sealed and placed under vacuum. The autoclave pressure is raised to 30 psig (310 kPa) with nitrogen and brought to vacuum three times. Reactor agitator is set at 65 RPM and the reactor is heated to 90° C. 80 ml of initiator solution containing 0.5 gm of ammonium persulfate (APS) per liter of deionized, deaerated water is added to the reactor, providing an APS concentration in the aqueous precharge of 6.9 ppm. The concentrations of the surfactants in the aqueous medium are 14.7 ppm and 3.5 ppm, respectively, and the salt concentration is 69.2 ppm. TFE is charged to the reactor to bring the reactor pressure to 400 psig (2.86 MPa). At time zero, 150 ml of an initiator solution in deionized, deaerated water containing 0.33 gm APS and 23.33 gm of 70 wt % active disuccinic acid peroxide (DSP) per liter of water is charged to the reactor at 80 ml/min. Kickoff time is measured as the time (since time zero) necessary to drop 10 psi (69 kPa) from the maximum pressure observed during injection of the initiator solution at time zero. Kickoff occurs in 6.8 minutes. The autoclave pressure is brought back to 400 psig (2.86 MPa) with makeup TFE and maintained at that pressure by adjusting makeup TFE flow for the duration of the polymerization. After 100 gm of makeup TFE has been fed, a passivated stabilizing solution containing Avanel® S70 is pumped at a rate of 4 ml/min until the end of the run. The time delay in commencing the addition of stabilizing surfactant to the aqueous medium is 7.9 min, the wt % delay corresponds to a PTFE concentration in the aqueous medium of 1.66 wt %, and the metering rate of the surfactant into the aqueous medium is 0.288 g/l-hr. After 2200 gm of TFE has been added to the reactor since Time Zero, the agitator is stopped, the reactor is vented to atmospheric pressure and the dispersion is discharged. The resultant aqueous dispersion has 24.7% solids having an average particle size by volume, Dv(50), of 178 nm. Polymer is coagulated by diluting the dispersion to about 10 wt % solids and adding aqueous ammonium carbonate solution followed by vigorous agitation until the polymer fully separates from the water. The PTFE is dried in a vacuum oven at 110° C. for 12 hours, and it is determined to exhibit the characteristics of the PTFE of Example 2.

The procedure for passivating the Avanel® surfactant is as follows: To a 1 liter glass bottle is added 30 gm of Avanel® S70 solution (10.5 gm active surfactant), 662.24 gm of deionized, deaerated water and 0.315 gm of iron(+2) sulfate heptahydrate. The mixture is stirred until all solids are dissolved. pH of this mixture is adjusted to 2.0-2.5 with 12 to 16 drops of concentrated sulfuric acid. While agitating and holding at 22-23° C., 37.34 gm of 30 wt % hydrogen peroxide is slowly added to the mixture over a period of 1 to 2 minutes. After addition of the hydrogen peroxide stirring is continued for 1 hour before the resulting passivated surfactant solution is used in the above polymerization.

Example 10

This Example compares the polymerization process carried out with and without the presence of metal ions, $Fe^{+2}$ provided by iron(II) sulfate, $FeSO_4.7H_2O$, together with hydrocarbon surfactant.

The general polymerization procedure used in this Example is as follows unless otherwise indicated:

To a 12 liter, horizontally disposed, jacketed, stainless steel reactor with a two blade agitator is added 5200 gm of deionized, deaerated water and 250 gm of liquid wax. To the reactor is added an additional 500 gm of deionized, deaerated water which contains 0.085 gm of Pluronic® 31R1, and 0.4 gm of sodium sulfite. The reactor is sealed and placed under vacuum. The reactor pressure is raised to 30 psig (310 kPa) with nitrogen and brought to vacuum 3 times. The agitator speed is set to 65 RPM and the reactor is heated to 90° C. 80 ml of a solution containing 0.5 gm of ammonium persulfate (APS) initiator per liter of water is added to the reactor, providing an APS concentration in the water added so far to the reactor of 6.9 ppm. At this stage the concentration of Pluronic®31R1 is 14.7 ppm and that of the sodium sulfite is 6.9 ppm. This is the stage of the reaction wherein oleophilic nucleation sites are formed prior to kickoff of the polymerization reaction. The ppm of ingredients added to the aqueous medium stated above are based on the total amount of water present in the reactor up until this time. Solutions of ingredients are considered to consist entirely of water in this ppm calculation.

TFE is next charged to the reactor to bring the reactor pressure to 400 psig (2.86 MPa). 150 ml of an initiator solution composed of 11.67 gm of (70% active) disuccinic acid peroxide, 0.17 gm of ammonium persulfate and 488.3 gm of deionized water is charged to the reactor at 80 ml/min. Kickoff of the polymerization reaction is considered to have occurred after a drop of 10 psi (69 kPa) from the maximum pressure observed during injection of the initiator solution. Reactor pressure is brought back to 400 psig (2.86 MPa) with makeup TFE and maintained at that pressure for the duration of the polymerization by continuous addition of makeup TFE. After 100 gm of TFE has been fed since kickoff, surfactant solution with or without metal ions is pumped to the reactor at a rate of 4 ml/min (0.288 g/l-hr of metal ion) until the end of the run, i.e. until the addition of makeup TFE to the reactor is stopped. After the prescribed amount of makeup TFE has been added to the reactor, the agitator is stopped, this establishing the completion of the polymerization reaction. After venting of the reactor (removal of unreacted TFE), the polymer dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven.

Coagulum (total undispersed solids) is obtained by further removing liquid wax from the dry filtered solids plus adhered polymer by centrifuging and blotting the polymer to remove wax. The polymer dispersion is coagulated by diluting the dispersion water to about 10 wt % solids and adding aqueous ammonium carbonate solution followed by vigorous agitation until the polymer fully separates from the water. The resultant polymer is dried in a vacuum oven at 110° C. for 12 hours. Melting point and heat of fusion of this polymer is determined by Differential Scanning calorimeter (DSC). The polymer is PTFE having a molecular weight (Mn) of at least 1,000,000. The particle size of the dispersed polymer is determined by laser light scattering, as follows. Particle size of the raw dispersion of fluoropolymer particles is measured using laser light scattering with a Zetasizer Nano-ZS manufactured by Malvern Instruments. Samples for analysis are prepared in 10×10×45 mm polystyrene cuvettes, capped and placed in the device for analysis. Preparation of the Sample is as Follows. Water Used to Flush the Cuvette and used to dilute the dispersion sample is rendered substantially free of particles by drawing deionized, deaerated water into a 10 cc glass hypodermic syringe with locking tip. A Whatman 0.02 micron filter (Cat. No. 6809-2002) is fitted to the locking tip of the syringe and pressure is applied force water through the filter and into the cuvette. Approximately 1.5 ml of water is placed in the cuvette, the cuvette is capped, shaken and uncapped. Water is poured out of the cuvette thus assuring the cuvette is free of particles. Approximately 2.5 gm of filtered water is placed in the cuvette. One drop of the fluoropolymer dispersion to be analyzed is added to the cuvette. The cuvette is capped and shaken to completely mix the fluoropolymer particles in the water. The sample is placed in the Nano-ZS for determination of Dv(50). Dv(50) is the median particle size based on volumetric particle size distribution, i.e. the particle size below which 50% of the volume of the population resides.

TABLE 1

| Exp. Table 1 # | Surfactant Pumped ml | Pumped ppm on water | Salt | Metal ion Pumped ppm cation on water | wt % cation on surfactant | Batch Time min |
|---|---|---|---|---|---|---|
| 1 - comparison | 637 | 1396 | None | 0 | 0 | 165.0 |
| 2 | 180 | 424 | FeSO$_4$—7H2O | 2.6 | 0.6032 | 51.2 |

| Exp. # | Dispersion % Solids | Dv(50) nm | Coag. % | STY gm/(L-hr) |
|---|---|---|---|---|
| 1 comparison | 17.60 | 144 | 1.14 | 43.49 |
| 2 | 17.94 | 150 | 1.12 | 132.80 |

The total amount of make-up TFE added to the reactor in Experiments 1 and 2 is 1250 g in each experiment. The surfactant in these Experiments is sodium dodecyl sulfate (SDS). The surfactant is added to the aqueous medium in the reactor as an aqueous solution also containing the metal ions in the salt mentioned in table 1. The stock solution containing the SDS and salt (Experiment 2) contains 1.439 g of the SDS and 0.0432 g of the salt/100 g of water. The stock solution for Experiment 1 contains only the SDS in the same amount as for Experiment 2.

With respect to the column headings in Table 1, the "ppm on water" of surfactant is the total weight of surfactant added in the total weight of water added to the polymerization reactor until completion of the polymerization. The "ppm cation on water" is the weight ppm of the $Fe^{+2}$ in the total amount of water added to the reactor during the entire process (nucleation site formation plus polymerization), i.e. until completion of the polymerization reaction. The "wt % cation on surfactant" is based on the total weight of the metal ion as compared to the total weight of the surfactant in the solution added to the aqueous medium during polymerization. The batch time is measured as the time from kickoff to the end of makeup TFE addition accompanied by discontinuance of agitation(completion of the polymerization reaction). The "Dispersion % solids" is the wt % of the polymer particles dispersed in the aqueous medium, based on the sum of the total weight of the dispersed polymer particles+total weight of water present at completion of the polymerization reaction. The coagulum (coag.) is the wt % of undispersed polymer, based on the total weight of fluoropolymer formed. STY has the meaning described above. These explanations of column headings apply to the same column headings in other Tables in the Examples that follow.

Experiment 1 shows that the SDS by itself produces a small particle size with respect to the % dispersion solids and a small % coagulum, but at the expense of a long batch time and the expected relatively low STY. When the $Fe^{+2}$ cation is present with the SDS during the polymerization reaction, the batch time is only about ⅓ of that of Experiment 1 and the STY is increased by about 300%. The $Fe^{+2}$ cation also increases the effectiveness of the SDS surfactant by enabling the formation of about the same amount of % solids and coagulum with the use of much less SDS. The DSC melting temperature of the PTFE formed in this Example is 334.69° C. and 334.01° C. for Experiments 1 and 2, respectively. The heat of fusions of the PTFE are for Experiment 1: 75.65 J/gm (first heat) and 38.43 J/Gm (second heat). For Experiment 2, the heats of fusion are 74.36 J/gm (first heat) and 41.73 J/gm (second heat).

Example 11

The Example compares polymerization results by the procedure of Example 10 using SDS as the stabilizing surfactant and different amounts of metal cation added with the SDS as reported in Table 2. The metal cation is $Fe^{+2}$ provided by iron(II) sulfate, $FeSO_4 \cdot 7H_2O$.

TABLE 2

| | Surfactant Sol'n Concentration | | Surfactant Sol'n Pumped | | | |
|---|---|---|---|---|---|---|
| Exp. # | SDS gm/L | Salt gm/L | SDS ppm on water | ppm cation on water | wt % cation on SDS | Batch Time Min |
| 3 | 14.39 | 0.216 | 447 | 1.3 | 0.3015 | 53.4 |
| 4 | 14.39 | 0.432 | 405 | 2.4 | 0.6026 | 50.0 |
| 5 | 14.39 | 0.648 | 371 | 3.4 | 0.9046 | 46.4 |

| | Dispersion | | | STY |
|---|---|---|---|---|
| Exp. # | % Solids | Dv(50) nm | Coag. % | gm/ (L-hr) |
| 3 | 16.26 | 138 | 0.74 | 111.46 |
| 4 | 16.35 | 122 | 0.33 | 120.50 |
| 5 | 16.63 | 131 | 0.68 | 130.51 |

The "Surfactant Sol'n Concentration" is the SDS and $FeSO_4 \cdot 7H_2O$ concentrations of the solution feed to the reactor. The "Salt gm/L" is the concentration of the salt, i.e. its total weight that includes the weight of the metal cation. This meaning is applicable to the same column heading in Tables that follow. The total amount of TFE makeup TFE is 1000 g. The polymerization of Experiment 4 produces the best result in terms of the combination of smallest PTFE particle size, smallest amount of % coagulum and a high STY. The melting temperatures (first heat) of the PTFE produced in these Experiment all exceed 332° C. and the decreases in heat of fusion from the first heat to the second heat melting all exceed 27 J/gm.

Example 12

This Example carries out the polymerizations of Example 10 but to the use of a greater amounts of makeup TFE to produce higher % s solids. Experiments 6 and 7 employ 2200 g makeup TFE and Experiment 8 employs 3100 g makeup TFE. As in Example 10, the stabilizing surfactant is SDS and the metal cation is either $Fe^{+2}$ provided as $FeSO_4 \cdot 7H_2O$ or $Cu^{+2}$ provided by copper(II) sulfate, $CuSO_4 \cdot 5H_2O$. The results are reported in Table 3.

TABLE 3

| | Surfactant Sol'n Concentration | | Surfactant Solution Pumped | | | | |
|---|---|---|---|---|---|---|---|
| Exp # | SDS gm/L | Salt gm/L | SDS ppm on water | SALT | gm SALT | ppm cat. on water | wt % cation on SDS |
| 6 | 14.4 | 0.432 | 627 | $FeSO_4 \cdot 7H2O$ | 0.1166 | 3.8 | 0.6032 |
| 7 | 14.6 | 0.388 | 659 | $CuSO_4 \cdot 5H2O$ | 0.1086 | 4.5 | 0.6751 |
| 8 | 14.4 | 0.432 | 932 | $FeSO_4 \cdot 7H2O$ | 0.1773 | 5.6 | 0.6026 |

TABLE 3-continued

| | TFE Fed gm | Batch Time min | Dispersion | | | STY gm/ (L-hr) |
|---|---|---|---|---|---|---|
| Exp. # | | | % Solids | Dv(50) nm | Coag % | |
| 6 | 2200 | 72.9 | 27.48 | 183 | 1.66 | 162.8 |
| 7 | 2200 | 76.4 | 26.99 | 161 | 0.17 | 150.4 |
| 8 | 3100 | 111.7 | 34.28 | 195 | 1.22 | 148.0 |

All of these polymerizations produce high % solids, accompanied by small particle size relative to this high % solids, together with relatively low % coagulum and high STY as compared to Comparison Experiment 1. The melting temperatures of the PTFEs formed in these Experiments exceed 335° C. and the reductions in heat of fusion from the first heat to the second heat melting exceed 25 J/gm. The PTFE of Experiment 7 has a melting temperature (first heat) of 336.76° C., an SSG (standard specific gravity) of 2.212, which corresponds to a molecular weight (Mn) of 2,700,000, determined in accordance with the equation described by R. C. Doban et al., "Formula from molecular weight of Polytetrafluoroethylene", ASC Meeting, Atlantic City, N.J. September 1956 (also published at p. 15 of WO2009/013214).

Example 13

Following the polymerization procedure of Example 10, this Example compares polymerizations results using different metal ions added with the SDS stabilizing surfactant solution. The results are reported in Table 4.

TABLE 4

| | Surfactant Solution Pumped | | | | |
|---|---|---|---|---|---|
| Exp. # | Salt Conc gm/L | SDS ppm on water | SALT | ppm cation on water | Wt % cation on SDS |
| 9 | 0.4315 | 405 | FeSO4—7H2O | 2.4 | 0.6026 |
| 10 | 0.1700 | 506 | CuSO4—5H2O | 1.5 | 0.3006 |
| 11 | 0.3411 | 382 | CuSO4—5H2O | 2.3 | 0.6035 |
| 12 | 0.5120 | 433 | CuSO4—5H2O | 3.9 | 0.9055 |
| 13 | 0.4320 | 422 | FeSO4—7H2O | 2.5 | 0.6031 |
| 14 | 0.2118 | 606 | ZnCl2 | 4.3 | 0.062 |

| | Batch Time min | Dispersion | | | STY gm/ (L-hr) |
|---|---|---|---|---|---|
| Exp. # | | % Solids | Dv(50) nm | Coag. % | |
| 9 | 50.0 | 16.35 | 122 | 0.33 | 120.50 |
| 10 | 64.0 | 16.07 | 113 | 0.20 | 93.62 |
| 11 | 48.9 | 16.50 | 116 | 0.26 | 124.02 |
| 12 | 58.9 | 16.33 | 114 | 0.10 | 101.71 |
| 13 | 50.0 | 17.57 | 128 | 1.02 | 123.64 |
| 14 | 70.0 | 17.36 | 165 | 1.64 | 91.91 |

In these Experiments, the makeup TFE added is 1000 g. All of these polymerizations produce relatively low % coagulum and high STY as compared to Comparison Experiment 1. Further, all of these polymerizations produce PTFE having a melting temperature of greater than 332° C. and reduction in heat of fusion from the first heat to the second heat melting of greater than 28 J/gm.

When the process of these Experiments is repeated except that Na ion is used as the cation (supplied as the salt $Na_2SO_3$) in the amount to provide an $Na^+$ ion concentration of 1.3 ppm based on the total weight of water upon completion of the polymerization reaction, the result is the formation of greater than 9% coagulum.

Example 14

Following the polymerization procedure of Example 10, this Example compares polymerization results using different metal cations similar to Example 13 except that the makeup of TFE is increased to 1250 g. The results are reported in Table 5.

TABLE 5

| | | Surfactant Solution Pumped | | | | |
|---|---|---|---|---|---|---|
| Exp. # | Salt Conc gm/L | SDS ppm on water | SALT | gm SALT | ppm cation on water | Wt % cation on SDS |
| 2 | 0.4320 | 424 | FeSO4—7H2O | 0.0778 | 2.6 | 0.6032 |
| 16 | 0.3411 | 399 | CuSO4—5H2O | 0.0576 | 2.4 | 0.6035 |
| 17 | 0.2671 | 1083 | MnSO4—H2O | 0.1290 | 6.5 | 0.6036 |
| 18 | 0.3877 | 1259 | NiSO4—6H2O | 0.2206 | 7.6 | 0.6019 |

| | Batch | Dispersion | | | STY |
|---|---|---|---|---|---|
| Exp. # | Time min | % Solids | Dv(50) nm | Coag. % | gm/ (L-hr) |
| 2 | 51.2 | 17.94 | 150 | 1.12 | 132.80 |
| 16 | 48.0 | 17.74 | 131 | 0.03 | 139.35 |
| 17 | 125.5 | 17.96 | 171 | 1.11 | 56.68 |
| 18 | 146.3 | 17.84 | 183 | 1.43 | 48.90 |

Under the conditions of these Experiments, the metal ions $Fe^{+2}$ and $Cu^{+2}$ give the best combination of results in terms of particle size % coagulum and STY. The melting temperature of the PTFEs all exceeded 333° C. and the reductions in heats of fusion from the first heat to the second heat melting is 32.6 J/gm, 32.0 J/gm, 37.3 J/gm, and 37.3 J/gm for Experiments 2, 16, 17, and 18, respectively.

Example 15

Following the polymerization procedure of Example 10, this Example compares polymerization results using both different stabilizing surfactants and metal cations, all with the TFE makeup amount being 2200 g. The results are reported in Table 6.

TABLE 6

| | | Surfactant Solution Pumped | | | | |
|---|---|---|---|---|---|---|
| Exp. # | Salt Conc gm/L | Surf. | Surf. ppm on water | SALT | ppm cation on water | Wt % cation on Surf. |
| 6 | 0.432 | SDS | 627 | FeSO4—7H2O | 3.8 | 0.6032 |
| 7 | 0.388 | SDS | 659 | CuSO4—5H2O | 4.5 | 0.6751 |
| 19 | 0.432 | K8300 | 1098 | FeSO4—7H2O | 6.6 | 0.6031 |
| 20 | 0.388 | S-74 | 1366 | CuSO4—5H2O | 9.4 | 0.6863 |
| 21 | 0.388 | S-70 | 994 | CuSO4—5H2O | 6.8 | 0.6863 |

| | Batch | Dispersion | | | STY |
|---|---|---|---|---|---|
| Exp. # | Time min | % Solids | Dv(50) nm | Coag. % | gm/ (L-hr) |
| 6 | 72.9 | 27.48 | 183 | 1.66 | 162.8 |
| 7 | 76.4 | 26.99 | 161 | 0.17 | 150.4 |
| 19 | 125.9 | 26.67 | 199 | 2.52 | 92.9 |
| 20 | 162.8 | 26.27 | 154 | 0.23 | 72.9 |
| 21 | 118.3 | 26.33 | 153 | 3.26 | 94.8 |

All of the polymerizations produced small particles at the high % solids obtained, together with low % coagulum and good-to better STY than Comparison Experiment 1. The melting temperatures of the PTFEs produced all exceed 335° C. and the reduction in heats of fusion from the first heat to the second heat melting all exceed 29 J/gm.

Example 16

Following the polymerization procedure of Example 10, this Example compares polymerization results with different timing on the addition of the metal cation to the aqueous medium in the reactor. SDS is the stabilizing surfactant, and $FeSO_4 \cdot 7H_2O$ is the salt supplying the metal cation. The amount of TFE makeup is 1250 gm.

TABLE 7

| | Batch | Dispersion | | | STY |
|---|---|---|---|---|---|
| Exp. # | Time min | % Solids | Dv(50) nm | Coag. % | gm/ (L-hr) |
| 2 | 51.2 | 17.94 | 150 | 1.12 | 132.8 |
| 22 | 44.9 | 18.30 | 175 | 1.52 | 153.2 |
| 23 | 58.0 | 18.11 | 243 | 9.50 | 111.8 |

Experiment 2 follows the general polymerization procedure described above, wherein the salt (metal cation) is added to the aqueous polymerization medium in a solution along with dissolved stabilizing surfactant. The resultant solution is as described in Table 1.

Experiment 22 follows the general polymerization procedure, except for adding the entire amount of salt to the aqueous polymerization medium at the same time that addition of the surfactant solution to this medium commences. Thus the surfactant solution added to the aqueous polymerization medium has only the SDS dissolved therein. The total amount of SDS added to the aqueous medium provides a concentration of the of 382 ppm of SDS based on the total amount of water present in the aqueous medium upon completion of the polymerization. The amount of $Fe^{+2}$ cation added to the aqueous polymerization medium provides the concentration of 2.8 ppm based on the total amount of water present in the aqueous medium upon the completion of the polymerization reaction, as compared with 2.6 ppm for Experiment 2.

Experiment 23 follows the general polymerization procedure; except for adding the entire amount of salt, the same as in Experiment 22, to the aqueous polymerization medium along with the addition of the initial charge of 5200 gm of water to the reactor. Thus the SDS addition follows the procedure of Experiment 22.

The result as reported in Table 7 is that addition of the salt too early in the process (Experiment 23) causes the particle size to be large for the % solids formed and the % coagulum to be high. The results of Experiments 2 and 22 are both improvements over Experiment 23.

The PTFE's obtained in the foregoing Experiments all exhibit an MFR of 0 (ASTM D 1238, 372° C., 5 kg weight), indicating the non-melt flowability of the PTFEs because of their extremely high molecular weight.

Example 17

This Example discloses the polymerization to make fluoroelastomer of VF2/HFP/TFE using sodium dodecyl sulfate as the stabilizing surfactant. Passivation of the stabilizing surfactant is performed prior to its addition to the polymerization reactor.

To a 40 liter, vertically disposed, jacketed, stainless steel autoclave reactor is added 23000 gm of deionized, deaerated water. To the reactor is added an additional 2016 gm of deionized, deaerated water which contains 0.04 gm of Pluronic® 31R1 and 2.02 gm of sodium sulfite. The reactor is purged with start-up monomer mixture (4.0 wt % vinylidene fluoride (VF2), 86.0 wt % hexafluoropropene (HFP), and 10.0 wt % tetrafluoroethylene (TFE)) to 410 kPa and evacuated. This purging procedure is repeated until the oxygen in the reactor is less than 100 ppm. 16 ml initiator solution of 1 wt % ammonium persulfate and 5 wt % disodium phosphate heptahydrate is added to the reactor. The reactor is heated to 80° C. The reactor is pressurized with 2120 grams of start-up monomer (with the above composition). At the end of pressurization, the reactor pressure is 2068 kPa. At time zero, 50 ml of an initiator solution of 1 wt % ammonium persulfate and 5 wt % disodium phosphate heptahydrate is added to the reactor to start polymerization. As the reactor pressure drops, a fresh feed monomer mixture of 35.0 wt % VF2, 37.0 wt % HFP, and 28.0 wt % TFE is fed to the reactor to maintain a 2068 kPa pressure. Additional initiator solution is added in increments of 10 ml every 30 minutes to maintain polymerization rate. After 200 gm of fresh feed monomer mixture has been fed, stabilizing surfactant solution, prepared as described below, is pumped to the reactor at a rate 233 ml per 3000 gm monomer until 7916 gm fresh feed monomer is fed. This delay in commencing the addition of stabilizing surfactant to the aqueous medium corresponds to a polymer concentration in the aqueous medium of 0.79 wt %, and the metering rate of the surfactant into the aqueous medium is 0.01 g/l-hr. After a total of 8333 gm incremental fresh feed monomer had been fed, corresponding to a total of 510 ml initiator solution and 23.5 hours, monomer and initiator feed is discontinued. The reactor is cooled and the pressure in the reactor reduced to atmospheric. The resulting fluoroelastomer latex has a solids content of 23.6 wt % solids, a pH of 3.17, and an average particle diameter of 260 nm. The latex is coagulated with aluminum sulfate solution, washed with deionized water, and dried. The fluoroelastomer has an inherent viscosity of 0.57 dl/g, a Mooney viscosity, ML (1+10) at 121° C., of 118 and contains 33.5 wt % VF2, 38.4 wt % HFP, and 28.1 wt % TFE.

The stabilizing surfactant solution is prepared as follows: In a 1 liter, jacketed round bottom flask is added 492.5 gm of deionized, deaerated water, 7.5 gm of sodium dodecyl sulfate (ACS Reagent, >99.0%) and 0.225 gm of Fe (+2) sulfate heptahydrate. The contents are agitated until all solids are dissolved. The solution pH is adjusted to 3 with two drops of concentrated Sulfuric Acid. 18.75 gm of 30 wt % hydrogen peroxide is added to the mixture. The mixture is heated to 40° C. while stirring and held at temperature for 2 hours. The solution is discharged and cooled in an ice bath to rapidly bring the fluid to ambient temperature. The final mixture has a pH of 3.

In this example, the amount of passivation adjuvant, $Fe^{+2}$, is 0.603 wt % based on the total weight of the hydrocarbon-containing surfactant, sodium dodecyl sulfate, added to the polymerization reactor. The amount of $Fe^{+2}$ based on water in the reactor at the end of the batch is 2.0 ppm.

Example 18

This Example discloses the polymerization to make fluoroelastomer of TFE/PMVE using sodium dodecyl sulfate as the stabilizing surfactant. Passivation of the stabilizing surfactant is performed prior to its addition to the polymerization reactor.

To a 40 liter, vertically disposed, jacketed, stainless steel autoclave reactor is added 23000 gm of deionized, deaerated water. To the reactor is added an additional 2016 gm of deionized, deaerated water which contains 0.04 gm of Pluronic® 31R1 and 2.02 gm of sodium sulfite. The reactor is purged with start-up monomer mixture (25.0 wt % tetrafluoroethylene (TFE) and 75.0 wt % perfluoromethyl vinyl ether (PMVE)) to 410 kPa and evacuate. This purging procedure is repeated until the oxygen in the reactor is less than 100 ppm. 16 ml initiator solution of 1 wt % ammonium persulfate and 5 wt % disodium phosphate heptahydrate is added to the reactor. The reactor is heated to 80° C. The reactor is pressurized with 2344 grams of start-up monomer (with the above composition). At the end of pressurization, the reactor pressure is 2068 kPa. At time zero, 50 ml of an initiator solution of 1 wt % ammonium persulfate and 5 wt % disodium phosphate heptahydrate is added to the reactor to start polymerization. As the reactor pressure drops, a fresh feed monomer mixture of 50.0 wt % TFE and 50.0 wt % PMVE is fed to the reactor to maintain a 2068 kPa pressure. Additional initiator solution is added in increments of 10 ml every 30 minutes to maintain polymerization rate. After 200 gm of fresh feed monomer mixture has been fed, stabilizing surfactant solution, prepared as described in Example 15, is pumped to the reactor at a rate 233 ml per 3000 gm monomer until 7916 gm fresh feed monomer fed. This delay in commencing the addition of stabilizing surfactant to the aqueous medium corresponds to a PTFE concentration in the aqueous medium of 0.79 wt %, and the metering rate of the surfactant into the aqueous medium is 0.0065 g/l-hr. After a total of 8333 gm incremental fresh feed monomer had been fed, corresponding to a total of 760 ml initiator solution and 36 hours, monomer and initiator fed is discontinued. The reactor is cooled and the pressure in the reactor reduced to atmospheric. The resulting fluoroelastomer latex has a solids content of 22.9 wt % solids, a pH of 3.2, and an average particle diameter of 336 nm. The latex is coagulated with aluminum sulfate solution, washed with deionized water, and dried. The fluoroelastomer has a Mooney viscosity, ML (1+10) at 175° C., of 94 and contains 50.9 wt % TFE and 49.1 wt % PMVE.

In this example, the amount of passivation adjuvant, $Fe^{+2}$, is 0.603 wt % based on the total weight of the hydrocarbon-containing surfactant, sodium dodecyl sulfate, added to the polymerization reactor. The amount of $Fe^{+2}$ based on water in the reactor at the end of the batch is 1.98 ppm.

What is claimed is:

1. Process for polymerizing fluoromonomer in an aqueous medium in a polymerization reactor to form a dispersion of fluoropolymer particles in said aqueous medium, comprising (a) providing said aqueous medium in said reactor, (b) adding water-soluble hydrocarbon compound that contains hydrophobic moiety and hydrophilic moiety to said aqueous medium, (c) degrading said hydrophilic moiety of said compound in said aqueous medium, thereby enabling said hydrophobic moiety to form a dispersion of oleophilic nucleation sites in said aqueous medium, said dispersion of oleophilic nucleation sites being essentially free of surfactant, (d) pressuring up said reactor with said fluoromonomer to the pressure at which said polymerizing is carried out, and (e) adding polymerization initiator to said aqueous medium to cause kicking off of said polymerizing of said fluoromonomer.

2. The process of claim 1 and additionally, prior to step (c) adding water-soluble inorganic salt to said aqueous medium to aid in the formation of said dispersion of oleophilic nucleation sites.

3. The process of claim 2 wherein the amount of said hydrocarbon compound added to said aqueous medium is no greater than 50 ppm and the amount of said salt added to said aqueous medium is no greater than 120 ppm.

4. The process of claim 1 and additionally adding degradation agent to said aqueous medium to obtain said degrading.

5. The process of claim 4 wherein said degrading agent is polymerization initiator in an insufficient amount to cause said kicking off of said polymerizing of said fluoromonomer.

6. The process of claim 5 wherein said polymerization initiator is added in an amount that is no greater than 50 ppm.

* * * * *